United States Patent
Matoba

(10) Patent No.: US 8,035,858 B2
(45) Date of Patent: Oct. 11, 2011

(54) IMAGE PROCESSING APPARATUS AND METHOD ALLOW USER TO SET A SEQUENCE OF INSTRUCTIONS

(75) Inventor: Kazuo Matoba, Akashi (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1057 days.

(21) Appl. No.: 11/164,782

(22) Filed: Dec. 6, 2005

(65) Prior Publication Data

US 2007/0168387 A1    Jul. 19, 2007

(30) Foreign Application Priority Data

Aug. 15, 2005 (JP) ................ P2005-235357

(51) Int. Cl.
*G06K 15/00* (2006.01)
*G06F 7/00* (2006.01)
*G06F 17/30* (2006.01)
*G06F 3/00* (2006.01)

(52) U.S. Cl. .............. 358/2.1; 707/672; 707/792; 710/1

(58) Field of Classification Search .............. 707/104.1, 707/200, 826, 672, 802, 792, 770, 661; 710/1, 710/5, 33, 74; 358/1.15, 2.1, 508, 401, 448
See application file for complete search history.

(56) References Cited

U.S. PATENT DOCUMENTS 6,718,378 B1 *  4/2004  Machida .................. 709/223

FOREIGN PATENT DOCUMENTS

| JP | 6-164796 A   | 6/1994  |
| JP | 10-105540    | 4/1998  |
| JP | 2000-168173 A | 6/2000  |
| JP | 2000-172469  | 6/2000  |
| JP | 2001-350606  | 12/2001 |
| JP | 2003-018335 A | 1/2003  |
| JP | 2003-271352  | 9/2003  |
| JP | 2004-362608  | 12/2004 |
| JP | 2005-010603  | 1/2005  |
| JP | 2005-196307  | 7/2005  |

OTHER PUBLICATIONS

Notice of Reasons of Refusal in JP 2005-235357 dated Aug. 19, 2008, with English Translation thereof.

* cited by examiner

*Primary Examiner* — Benny Tieu
*Assistant Examiner* — Ngon Nguyen
(74) *Attorney, Agent, or Firm* — Buchanan Ingersoll & Rooney PC

(57) ABSTRACT

For image processing, user's setting of an item is received, and the item set by the user is recorded with information on situation of the setting of the item as setting log data. A parameter on reuse value is calculated based on one or more setting log data in the recorded setting log data, and operation information including the one or more setting log information is stored related with the parameter. When it is decided that the parameter satisfies a reference value, and the one or more setting log data having the parameter is presented.

20 Claims, 23 Drawing Sheets

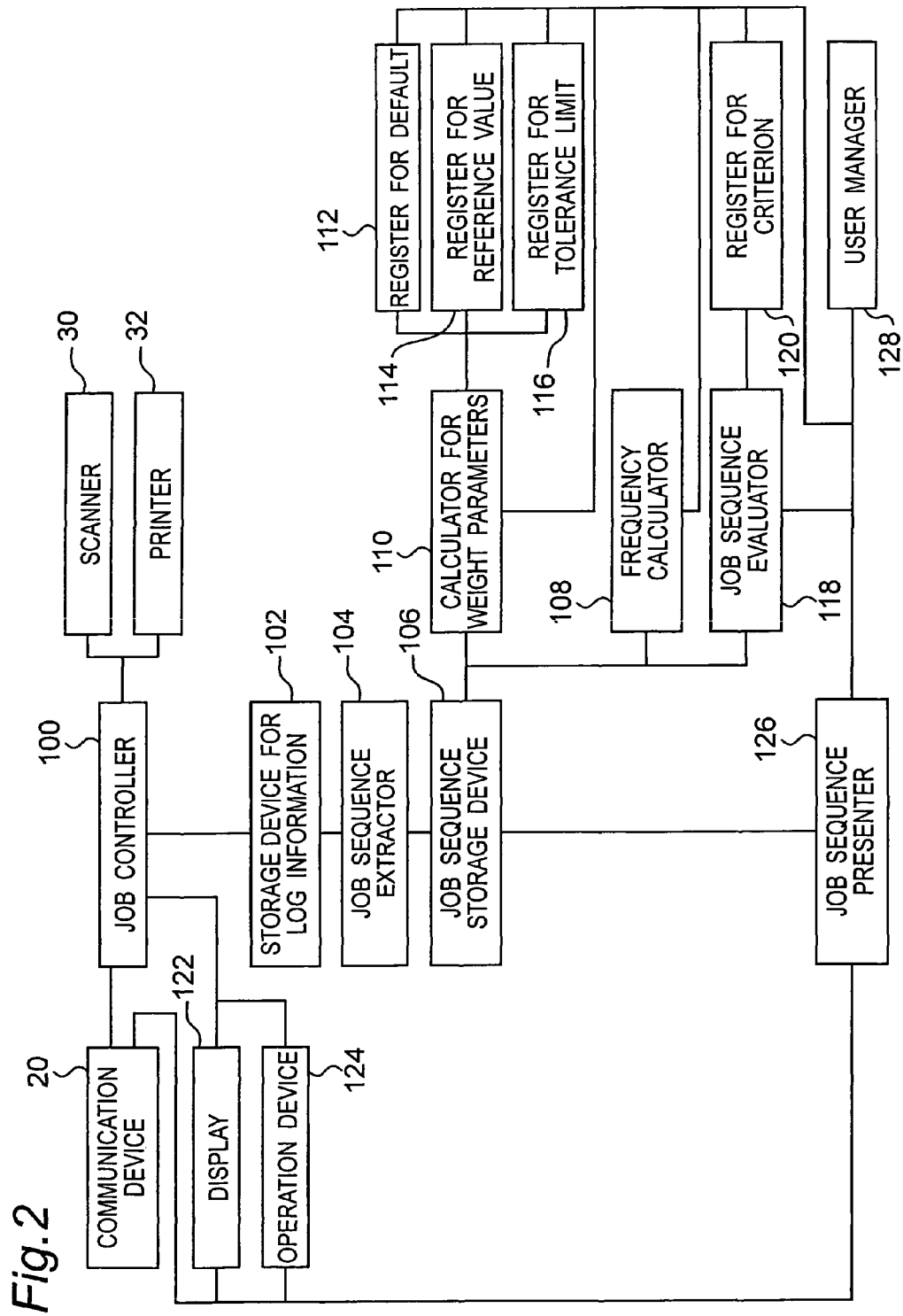

Fig.3

| USER ID : ABC | USER ID : DEF | USER ID : XYZ |
|---|---|---|
| | | |
| LOG ID : 1011<br>ITEM : RESOLUTION<br>CONTENTS : 200dpi<br>TIME : 14:35<br>PREVIOUS LOG ID : 1010<br>NEXT LOG ID : 1012 | LOG ID : 101<br>ITEM : LOG IN<br>CONTENTS : ID/PASSWORD<br>TIME : 10:35<br>PREVIOUS LOG ID : 100<br>NEXT LOG ID : 102 | LOG ID : 2011<br>ITEM : LAYOUT<br>CONTENTS : DOUBLE SIDE<br>TIME : 10:36<br>PREVIOUS LOG ID : 2010<br>NEXT LOG ID : 2012 |
| ⋮ | ⋮ | ⋮ |
| LOG ID : 1111<br>ITEM : SCAN<br>CONTENTS : IMEDIATELY<br>TIME : 14:40<br>PREVIOUS LOG ID : 1110<br>NEXT LOG ID : 1112 | LOG ID : 151<br>ITEM : LAYOUT<br>CONTENTS : 2 in 1<br>TIME : 14:00<br>PREVIOUS LOG ID : 150<br>NEXT LOG ID : 152 | LOG ID : 2012<br>ITEM : PRINT OUT<br>CONTENTS : IMEDIATELY<br>TIME : 16:39<br>PREVIOUS LOG ID : 2011<br>NEXT LOG ID : 2013 |
| | | |

Fig.4

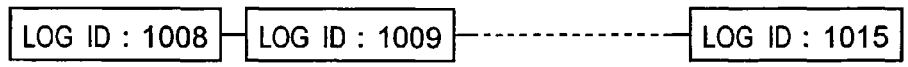

*Fig.5*

| USER ID : ABC |
|---|
| ⋮ |
| LOG ID : 1008<br>ITEM : LOG IN<br>CONTENTS : ID/PASSWORD<br>TIME : 14:34<br>PREVIOUS LOG ID : 1007<br>NEXT LOG ID : 1009 |
| LOG ID : 1009<br>ITEM : SELECT OPERATION<br>CONTENTS : SET SCAN AND TRANSMIT<br>TIME : 14:34<br>PREVIOUS LOG ID : 1008<br>NEXT LOG ID : 1010 |
| LOG ID : 1010<br>ITEM : FILE FORMAT<br>CONTENTS : PDF<br>TIME : 14:34<br>PREVIOUS LOG ID : 1009<br>NEXT LOG ID : 1011 |
| LOG ID : 1011<br>ITEM : RESOLUTION<br>CONTENTS : 200dpi<br>TIME : 14:35<br>PREVIOUS LOG ID : 1010<br>NEXT LOG ID : 1012 |
| LOG ID : 1012<br>ITEM : TRANSMISSION METHOD<br>CONTENTS : Email<br>TIME : 14:35<br>PREVIOUS LOG ID : 1011<br>NEXT LOG ID : 1013 |
| LOG ID : 1013<br>ITEM : SET ADDRESS<br>CONTENTS : xyz@example.com<br>TIME : 14:35<br>PREVIOUS LOG ID : 1012<br>NEXT LOG ID : 1014 |
| LOG ID : 1014<br>ITEM : TRANSMIT<br>CONTENTS : IMEDIATELY<br>TIME : 14:36<br>PREVIOUS LOG ID : 1013<br>NEXT LOG ID : 1015 |
| LOG ID : 1015<br>ITEM : LOG OUT<br>CONTENTS : IMEDIATELY<br>TIME : 14:36<br>PREVIOUS LOG ID : 1014<br>NEXT LOG ID : 1016 |
| ⋮ |

Fig.6

| SEQUENCE ID | USER ID | USE FREQUENCY | WEIGHT PARAMETER | EVALUATE |
|---|---|---|---|---|
| 1 | ABC | 281 | 11 | × |
| ... | ... | ... | ... | ... |
| 101 | XYZ | 38 | 128 | ○ |
| ... | ... | ... | ... | ... |

IMAGE PROCESSING APPARATUS AND METHOD ALLOW USER TO SET A SEQUENCE OF INSTRUCTIONS

This application is based on application No. 2005-235357 filed in Japan, the contents of which are hereby incorporated by reference.

BACKGROUND OF THE INVENTION

1. Field of the Invention

The present invention relates to an image processing apparatus such as a multifunctional peripheral, and in particular to user's operation therefor.

2. Description of Prior Art

Recently, an image processing apparatus has many advanced functions. For example, a multifunctional peripheral has many functions such as scan, print, copy and facsimile functions. Further, because it is a network device, it can be used for various processing via the network. As the functions of such an apparatus become advanced, and as works in an office become sophisticated, a user who operates an image processing apparatus has to select and set many items and their contents before starting a job. Because user's operation becomes more complicated and longer, as mentioned above, it is necessary to improve user's convenience. Then, various approaches are proposed. For example, the operation is stored by providing a program memory function such as a one-touch key to which, for example, an address is registered, an operation having high frequency is displayed with priority, and an operation is selected among the operations recorded in an operation history.

For example, in a facsimile apparatus described in Japanese Patent laid open Publication H6-164796, use frequencies of one-touch keys are counted, and the order of the one-touch keys displayed in a display device is changed according to the order of the use frequencies. Therefore, an operator can easily find a one-touch key used frequently. In a printer described in Japanese Patent laid open Publication 2000-168173, use frequencies of various setting items of print conditions are counted, and the setting items (or print conditions) having high frequencies are displayed as initial setting items. Further, in a scanner described in Japanese Patent laid open Publication 2003-18335, when a series of sequential setting is stored as a group of transmission condition setting in a history thereof. On transmission, the transmission condition setting history is invoked and selected, and user's convenience is improved for setting transmission conditions.

It is to be noted that an input operation for setting items to be executed in an image processing apparatus may have high reusability even though its use frequency is low. However, it has not attracted attention to improve user's convenience for such an operation. For example, in a program memory function such as one-touch key, user's operation can be stored or registered. However, in order to store or register it, a user has to store the operation intentionally, and an operation not stored cannot be used again. Further, in an image processing apparatus which takes only use frequency into account, the above-mentioned operation having low use frequency may not be stored even when the operation is likely to be used again. In such a case, when the user wants to use the setting again, a record on the setting is not stored in the image processing apparatus. Because the use frequency of the operation is low, the user is liable to forget the contents of the operation. In such a case, the user has to repeat the setting again, and the setting may need an elaborate effort. Therefore, in order to improve user's convenience, it is desirable to help a user to use easily an operation having low use frequency, but having high possibility to be used again.

SUMMARY OF THE INVENTION

An object of the invention is to improve user's convenience on an operation having low use frequency, but having high reusability.

In one aspect of the invention, in an image processing apparatus, an input device is provided for a user to set an item, and a recorder records the item set by the input device with information on situation of the setting of the item as setting log data. A calculator calculates a parameter on reuse value based on one or more setting log data in the recorded setting log data, and a storage device stores operation information including the one or more setting log data related with the parameter. A decider decides on the one or more setting log data whether the parameter satisfies a reference value, and a presenter which presents the one or more setting log data having the parameter satisfying the reference value. Thus, for an image processing apparatus having many functions, the parameter on reuse value relevant to reusability of a job sequence or the like can be evaluated by analyzing the recorded information on user's setting log.

In another aspect of the invention, in a method for image processing, user's setting of an item is received, and the item set by the user is recorded with information on situation of the setting of the item as setting log data. A parameter on reuse value is calculated based on one or more setting log data in the recorded setting log data, and operation information including the one or more setting log information related with the parameter is stored. Then, if is decided on the one or more setting log data that the parameter satisfies a reference value, the one or more setting log data having the parameter is presented.

An advantage of the present invention is that user's convenience is improved by presenting information on an operation having low use frequency, but having high possibility to be used again.

BRIEF DESCRIPTION OF THE DRAWINGS

These and other objects and features of the present invention will become clear from the following description taken in conjunction with the preferred embodiments thereof with reference to the accompanying drawings, and in which:

FIG. 2 is a block diagram on the functions in the image processing apparatus;

FIG. 3 is a diagram of an example of setting log record data for each user;

FIG. 4 is a diagram of an example of a job sequence;

FIG. 5 is a diagram of an example of log record data of a setting sequence;

FIG. 6 is a diagram on an example of parameter information on a job sequence;

DETAILED DESCRIPTION OF THE PREFERRED EMBODIMENTS

Figure 1:
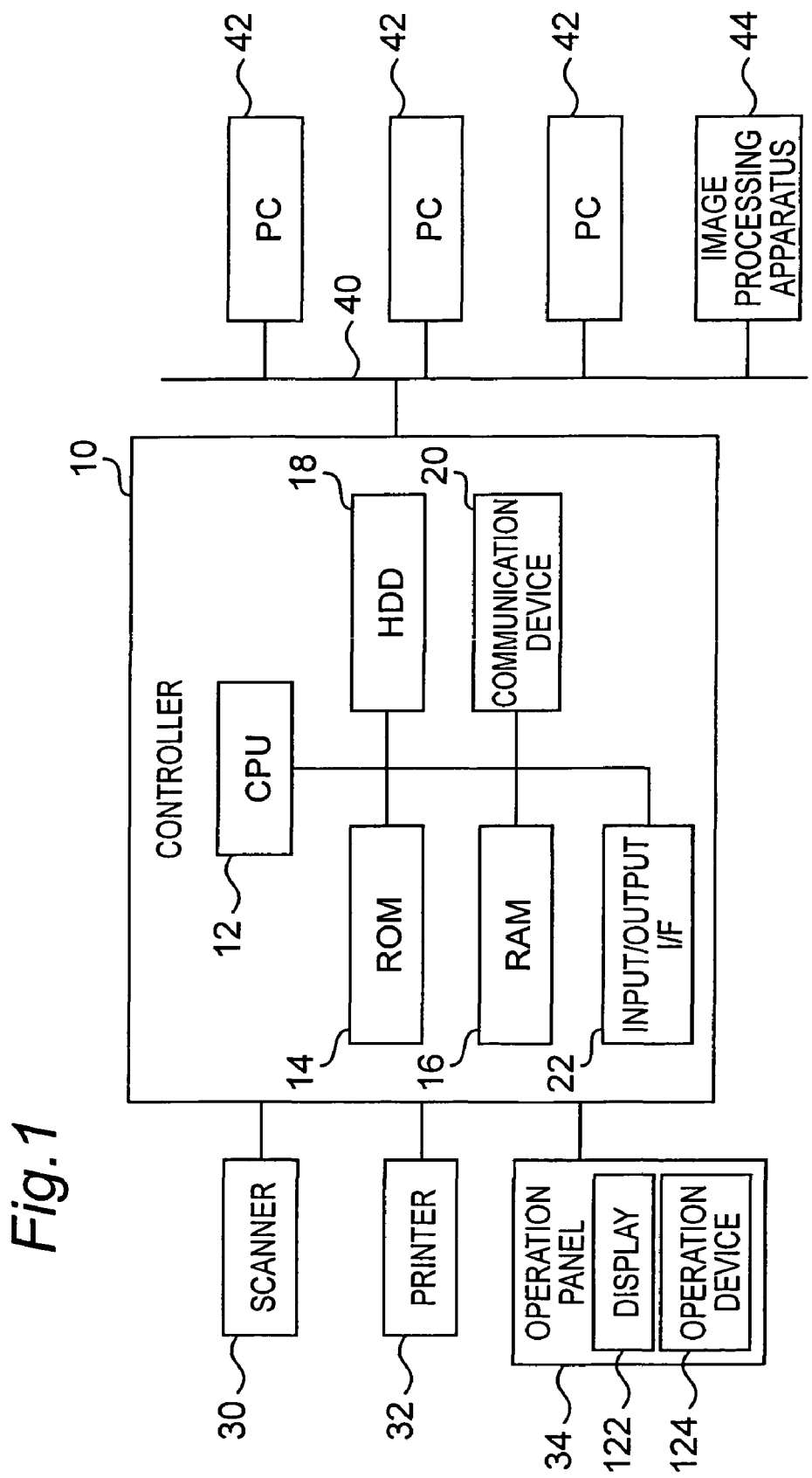
FIG. 1 is block diagram of an image processing apparatus.

Referring now to the drawings, wherein like reference characters designate like or corresponding parts throughout the several views, FIG. 1 shows a structure of a multifunctional peripheral (MFP) which can be operated as a printer, a scanner, a copying machine, a facsimile apparatus and the like. The multifunctional peripheral is an example of an image processing apparatus having many functions. A controller 10 is connected to an image reader section 30 for reading an image, a printer section 32 for forming an image on a paper or the like, and an operation panel 34 for displaying various data and the like and for receiving user's instruction for operating the apparatus. Explanation of the facsimile function is omitted here. In the controller 10, a central processing unit (CPU) for controlling the entire apparatus is connected to a read-only memory 14 for storing programs and data, a random access memory 16 used as a work area, a hard disk drive 18 having a large storage capacity, an communication device 20 for communication with the external and an input/output interface 22. The hard disk drive 18 stores various programs and data including a job management program and a user management program. Further, the controller 10 is connected through a network 40 such as a local area network to a computer (PC) 42, a different multi-functional peripheral 44 and the like. An instruction to the MFP can be inputted with the operation panel 34, or through the network 40 from the external computer 42 or the like.

FIG. 2 shows function blocks provided in the multi-functional peripheral as an image processing apparatus. Data received by the communication device 20 is controlled by a job controller 100 in the unit of job and is sent to the printer section 32 wherein the image data is formed on a paper. On the other hand, image data obtained by the image reader section 30 is also controlled by the job controller 100 in the unit of job and is sent to the printer section 32 wherein the image data is formed on a paper or to an external apparatus such as the computer 42, or is stored in the hard disk drive 18. In a copy operation, image data obtained by the image reader section 30 is controlled by the job controller 100 in the unit of job and is sent to the printer section 32 for forming the image data on a paper. A job is referred to a unit of user's operation including one setting item and its contents, and a unique log identification (ID) is assigned to each of the operation units. A job sequence denotes a series of log IDs relevant to each other and arranged in the order of operation. In this embodiment, a job sequence represents a series of operations from user's log-in to log-out, but in general a job sequence is not limited with the log-in and log-out. For example, a job sequence consists of a series of operations including a print, a scan, a facsimile transmission and/or the like from its start to end. The job controller 100 stores the contents of the setting items, inputted by a user with the operation panel 34 or received from the external computer 42, in the storage device 102 as setting log information to be explained later in detail.

FIG. 3 shows an example of a setting log record recorded for each user in the storage device 102 for the setting log information. Each setting log information has a log identification (ID) for identifying the log itself, a setting item to be set and its contents, and it further includes other data of information on the setting situation including a previous log ID on a setting log information just before the current setting log information, a next log ID on another setting log information just after the current setting log information, a user identification information and an operation time for setting the item. A job sequence extractor 104 searches the previous ID and the next ID in a setting log information. Then it extracts a job sequence which represents an order of operations in a series of jobs (operations) for the user (refer to FIG. 4). If a storage method which can store setting log information so as to make its position in a series of logs is adopted, it is not needed to record the previous and next IDs in the setting log information.

In the recording format as shown in FIG. 3, a job sequence extracted from the setting log information can be represented as a sequence of log IDs as shown in FIG. 4. That is, a plurality of setting logs can be serialized in the order of setting time because a setting log information includes the previous and next log IDs besides the log ID. In the example shown in FIG. 4, a series of log IDs relevant to each other can be serialized in the order of operation.

FIG. 5 shows an example of operation information including the setting log information according to the job sequence shown in FIG. 4. The operation information is used as a term to refer to a job and a series of setting log information included in a job sequence of the job. Therefore, operation information includes all the information necessary for executing a series of operations relevant to each other. In the example shown in FIG. 5, a setting log information is obtained by extracting a series of operations starting from a log-in operation, including "set scan and transmission speed", "set file format", "set resolution", "set transmission method", "set address" and "transmit", to a log-out operation. In concrete, user's operation is as follows:

(A) First, a user ID and a password are inputted with the operation panel 34 for a log-in (log ID=1008). A job sequence is started at the log-in.

(B) Next, a selection switch is operated for setting "scan and transmit" with the operation panel 34 (log ID=1009).

(C) Next, PDF format is set as a file format on the data obtained by the scan (log ID=1010).

(D) Next, resolution of the scanned image is set to 200 dpi (log ID=1011).

(E) Next, electronic mail is set as the transmission method for the data obtained by the scan (log ID=1012).

(F) Next, "transmit immediately" is set (log ID=1013).

(G) Next, a log-out is operated (log ID=1014). The job sequence is completed at the log-out.

Next, it is explained how to present and register a job sequence by taking a reuse value into account. The reuse value is related to user's reusability. First a job sequence or job sequences are extracted by analyzing the setting log data stored in the storage device 102. For the job sequences, a weight parameter is introduced on the reuse value for the user besides use frequency of the job sequence. Then, a job sequence or job sequences having high possibility to be used again are extracted automatically based on the weight parameters, and they are presented in a display device 122 in the operation panel 34.

It intended here to improve user's convenience on an operation which has low frequency, but high reusability. Generally, a parameter for representing reuse value is calculated on one or more setting log data in the setting log information for each user stored in the storage device 102. Then, the reusability is decided for each setting based on the parameters. An example of "one or more setting log data" is one setting log data. In this case, the parameter showing a reuse value is calculated according to the information on the setting situation and the contents for each setting. Then, the setting and the parameter are correlated and stored. Then, one or more settings satisfying a reference value are presented to the user. (In this case, extraction of job sequence to be explained later is not needed naturally.) A job sequence from a log-in to a log-out is another example of the "one or more setting log information". However, as mentioned above, it is generally a processing including a plurality of setting items related to each other, and it is not necessarily be limited with a log-in and a log-out. In the following explanation, decision and presentation of the reuse value are explained in the case that "one or more setting log information" is a job sequence, but the processing therefor is performed similarly in the other cases.

With reference to FIG. 2 again, the job sequence extractor 104 extracts log IDs related to each other in the logs stored in the storage device 102, and the extracted job IDs are stored in the job sequence storage device 106 as a job sequence wherein relevant log IDs are serialized in the order of operation (refer to FIG. 4). In order to decide the reuse value of the extracted job sequence, a calculator 110 calculates a parameter on the reuse value for each job sequence, and stores it in relation to the job sequence in a table in the job sequence storage device 106. A job sequence evaluator 118 evaluates for each job sequence whether it exceeds a reference value for presentation, and a job sequence presenter 126 presents a job sequence or job sequences decided to exceed the reference value. Further, a calculator 108 calculates use frequency for each job sequence. It is to be noted that the job controller 100, the job sequence extractor 104, the frequency calculator 108, the calculator 110 for weight parameter, the job frequency evaluator 118 and the job frequency presenter 126 shown in FIG. 2 are a part of the job control program executed by the CPU 12, while the storage device 102 for setting log information, the job sequence storage device 106, a register 112 for default values, a register 114 for reference values, a register 116 for tolerance limit, a register 120 for a criterion value, and a user manager 128 shown in FIG. 2 are a part of the data stored in the hard disk drive 18. A user identification information used in log-in processing and the like is obtained from the user manager 128 for storing user management information including user name and password.

An extracted job sequence is stored in the storage device 106, as mentioned above. When a job sequence is executed by a user, the frequency calculator 108 increments the use frequency of the job frequency by one. Further, the calculator 110 for weight parameter calculates a parameter representing reusability of a job sequence (hereinafter referred to as weight parameter) for each job sequence stored in the storage device 106 and stores it in the storage device 106 by linking it to the job sequence. Use frequency is also related to the reuse value of job sequence, but the above-mentioned reuse value does not include the use frequency. That is, the calculator 110 increases the weight parameter for a job sequence having low use frequency, but high reuse value. Various such weight parameters may be used, as will be explained later, and an appropriate one is adopted for the purpose. In the calculation of weight parameter, a default value stored in the register 112, a reference value stored in the register 114, a tolerance limit stored in the register 116 or the like may be used. The values in the registers 112, 114, 116 can be set with the display device 122 and the operation device 124 in the operation panel 34, and they may be set by the computer 42 or the other image processing apparatus 44 through the communication device 20 and the network 40.

The job sequence evaluator 118 evaluates each job sequence with the use frequency and the weight parameter(s), and selects a job sequence or job sequences to be presented to the user. It evaluates the job sequences by using the reference value set in the register 120 for the criterion value and decides whether the job sequence is presented or not. Alternatively, a user may set the criterion value in the register 120 as one of the use frequency, weight parameter(s) and user setting (not explained in detail). Alternatively, it may be a default one determined beforehand among them. Various reference values and the like for selecting a job sequence are stored in the registers 112-116 When the weight parameter is prioritized in the presentation, information on job sequences on which the reuse value exceeds the reference value are sent to the job sequence presenter 126.

FIG. 6 shows an example of a table in the job sequence storage device 106 including use frequency, weight parameter and evaluation mentioned above. For each job sequence, a sequence identification (ID) is given, and a weight parameter is calculated and stored in combination with the user identification (ID) and use frequency. Further, the result of evaluation by the job sequence evaluator 118 is also stored. The example shown in FIG. 6 includes one column for weight parameter, but a plurality of columns may be provided for storing various weight parameters obtained by various approaches. In the example shown in FIG. 6, the job sequence of sequence ID 101 has much lower use frequency than that of sequence ID 1, but it is decided to be presented to the user because its weight parameter is large.

Figure 7:
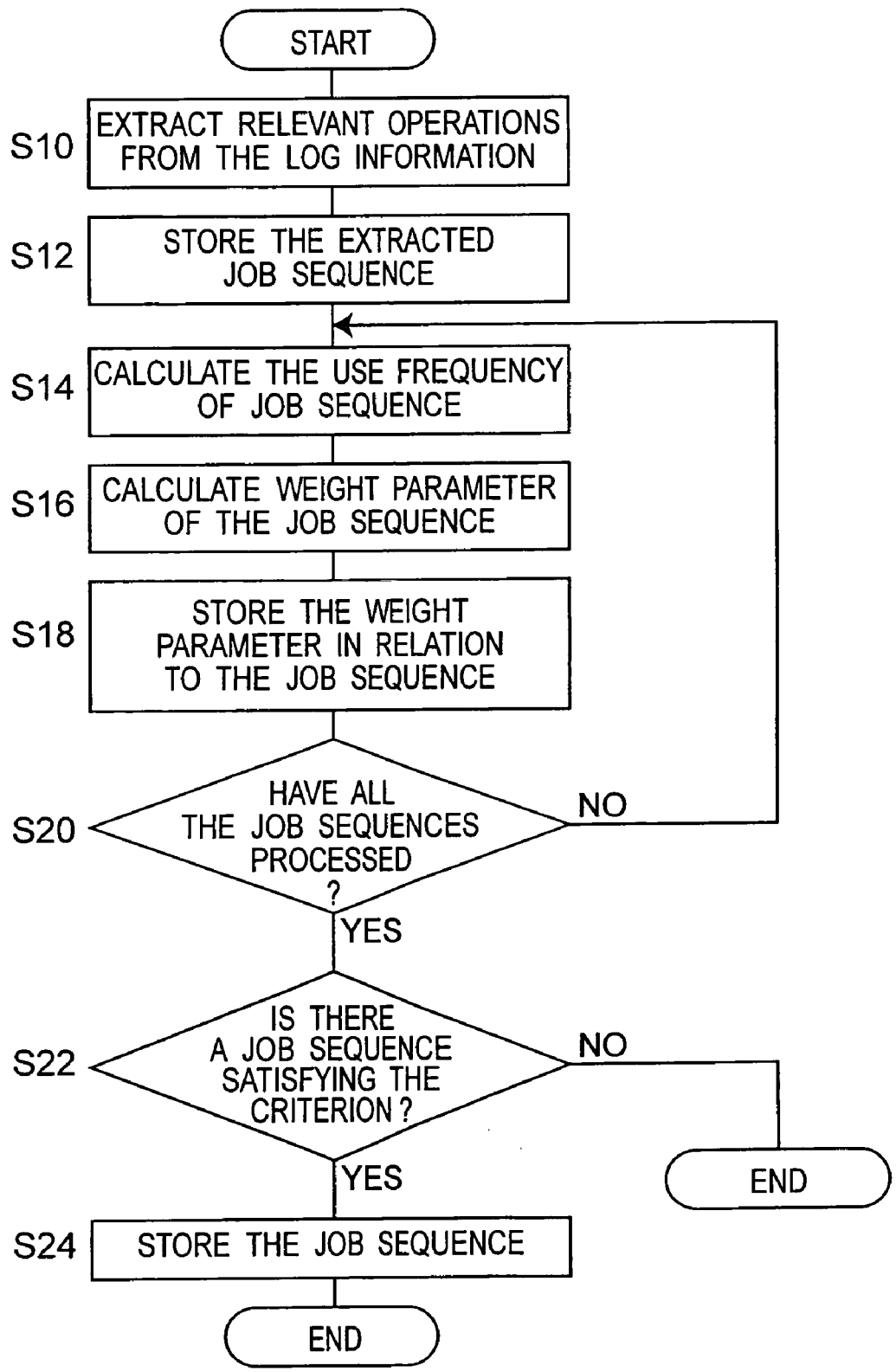
FIG. 7 is a flowchart of an operation from extraction to storage of job sequences.

FIG. 7 shows a flow from extraction to storage of a job sequence. In this example, all the job sequences are processed, but the objects of the processing may be limited to some job sequences which the user wants to evaluate. First, a job sequence is extracted from the setting log information in the storage device 102 (S10), and the extracted job sequences are stored in the storage device 106 (S12). This corresponds to the job frequency extractor 104 shown in FIG. 2. Next, use frequency on the job sequence is calculated (S14). This corresponds to the frequency calculator 108 shown in FIG. 2. Next, a weight parameter is calculated on the job sequence (S16). This corresponds to the weight parameter calculator 110 shown in FIG. 2. Next, the weight parameter is stored by linking it to the job sequence (S18). The above-mentioned calculation is repeated. When it is completed (YES at S20), it is decided next whether a job sequence satisfying the reference value is present or not (S22), and stores it, if any, in the job sequence storage device 106 (S24). If no such a job sequence is present, the flow is completed. This corresponds to the job sequence evaluator 118 in FIG. 2.

The job sequence presenter 126 reads the information on the selected job sequences from the job sequence storage device 106 and displays them in the display device 122, according to user's instructions. Further, such a job sequence can be registered to a one-touch key or the like in the operation device 124 in the operation panel 34. The one-touch key is provided to instruct the job sequence easily by operating it in the operation panel 34. Further, the selected job sequence can be transmitted by the communication device 20 to the external computer 42 or the image processing device 44. Alternatively, a job sequence desired by a user can be registered through the communication device 20 according to the operation from the external computer 42 or the image processing device 44.

Next, some examples of the calculator 110 for weight parameters are explained. The weight parameter represents a weight on the reuse value of a job sequence. The reuse value can be evaluated from various viewpoints. In this embodiment, the weight parameter can be calculated on five items, that is, degree of dissimilarity from a default value, deviation from periodicity obtained by the period data and the time elapsed from the previous execution, a length of the job sequence, the number of addresses in the case of broadcast transmission, and a tolerance limit on the reference length of job sequence. Examples of the calculator 110 for the five items are explained below.

Figure 8:
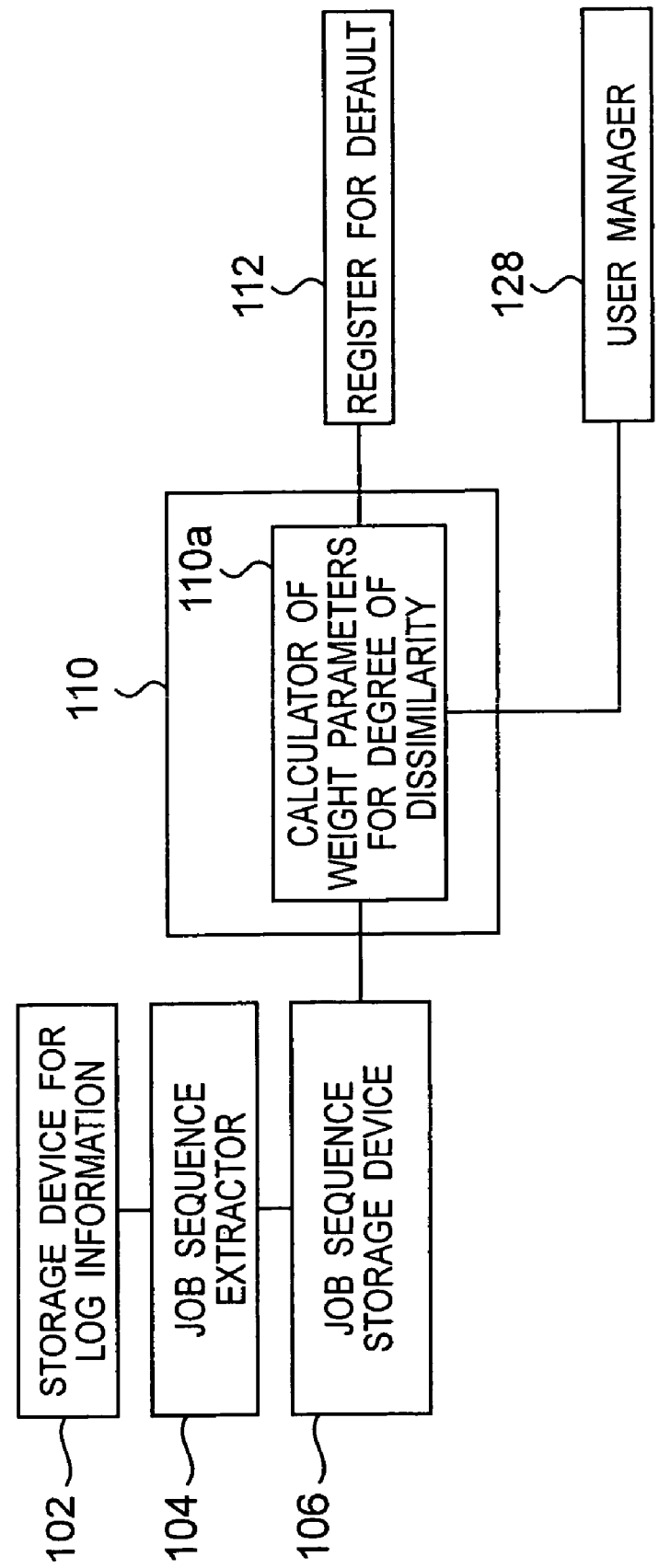
FIG. 8 is a block diagram of calculation of a weight parameter on a job sequence based on degree of dissimilarity from a default value.

In the calculator 110 for weight parameter shown in FIG. 8, a calculator 110a for degree of dissimilarity calculates the weight parameter on a job sequence based on degree of dissimilarity from the default value stored in the register 112. The weight parameter is increased as the degree of dissimilarity becomes larger according to a following reason. When the degree of dissimilarity is large, the job sequence is quite different from a conventional job sequence. Thus, it is deemed that it is set for a special purpose or usage so that it has large reuse value. Though a user does not use the job sequence frequently, user's convenience is improved by presenting such a job sequence for a special purpose or usage.

Figure 9:
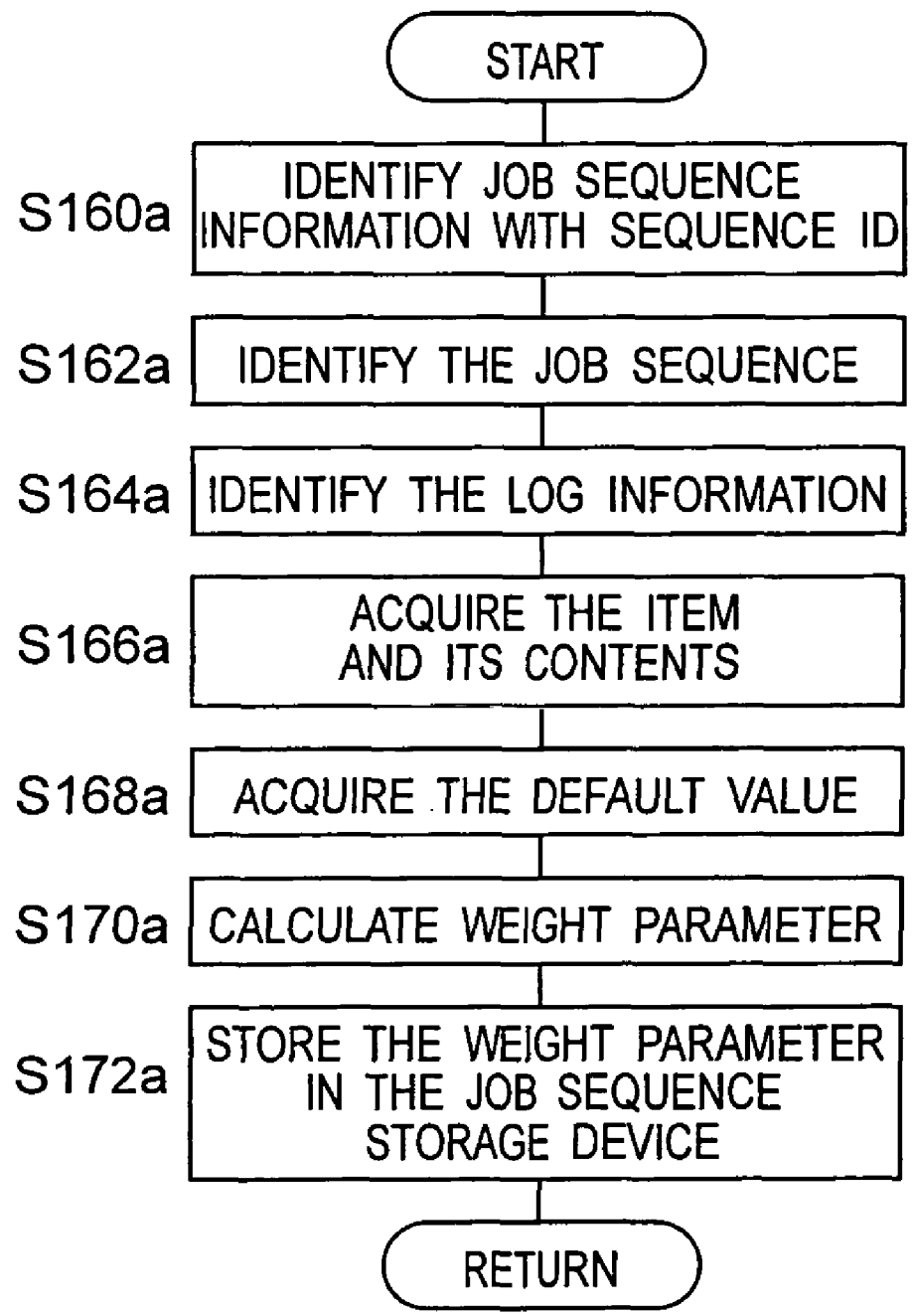
FIG. 9 is a flowchart of the calculation of the weight parameter on a job sequence for degree of dissimilarity in a calculator.
Figure 10:
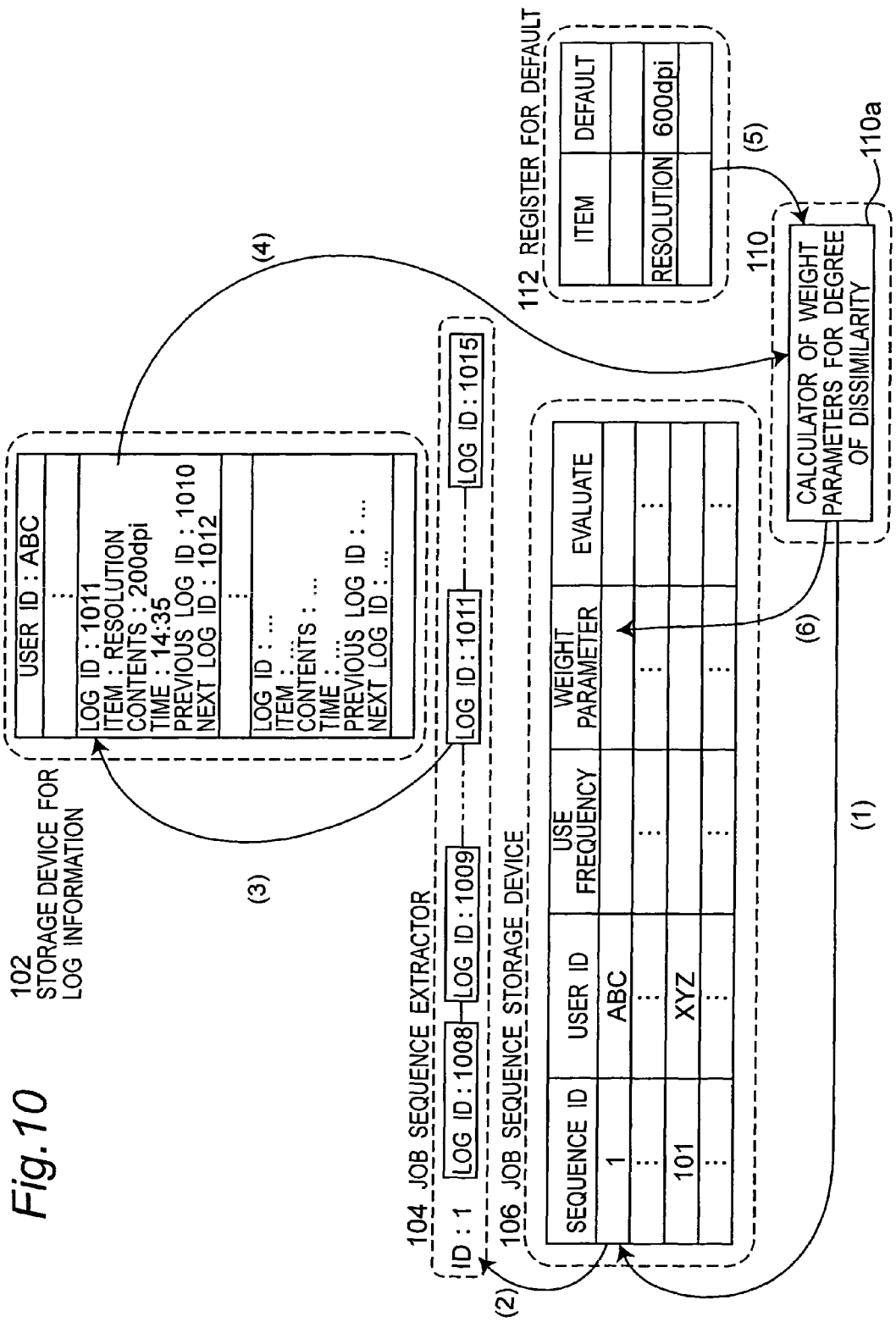
FIG. 10 is a diagram for illustrating a flow for calculating the weight parameter on a job sequence based on degree of dissimilarity from a default value.

FIG. 9 shows a flowchart for calculating the weight parameter of a job sequence for the degree of dissimilarity, while FIG. 10 shows a flow on the calculation of the weight parameter in the calculator 110a. First, (A) a job sequence information stored in the storage device 106 is identified with the sequence ID (S160a), and (B) a job sequence as an object is identified with the sequence ID by the job sequence extractor 104 (S162a). (C) A setting log data in the job sequence is identified in the storage device 102 (S164a), and (D) data on the setting item and the setting contents are acquired from the setting log data (S166a). Next, (E) the default value stored in the register 112 is acquired (S168a), and the weight parameter is calculated by using the setting log data (S170a). In this example, the degree of dissimilarity is calculated as the weight parameter on resolution between the setting data in the log data (actual resolution) and the default setting value. In concrete, the resolution is set to 200 dpi in the setting log data, while the default setting value is 600 dpi. Thus, the discrepancy between them is 400 dpi, and the weight parameter is set to, for example, four based on the discrepancy. (F) The result is stored in the table in the storage device 106 in the column of weight parameter for the job sequence (S172a). In this example, the discrepancy is calculated by multiplying a predetermined factor with an absolute value of the difference between the two numerical values. Alternatively, a different formula is provided for calculating the degree of dissimilarity quantitatively. Alternatively, a formula may be changed for each of different setting items. Further, the formula may be changed for each user even for the same setting item.

Figure 11:
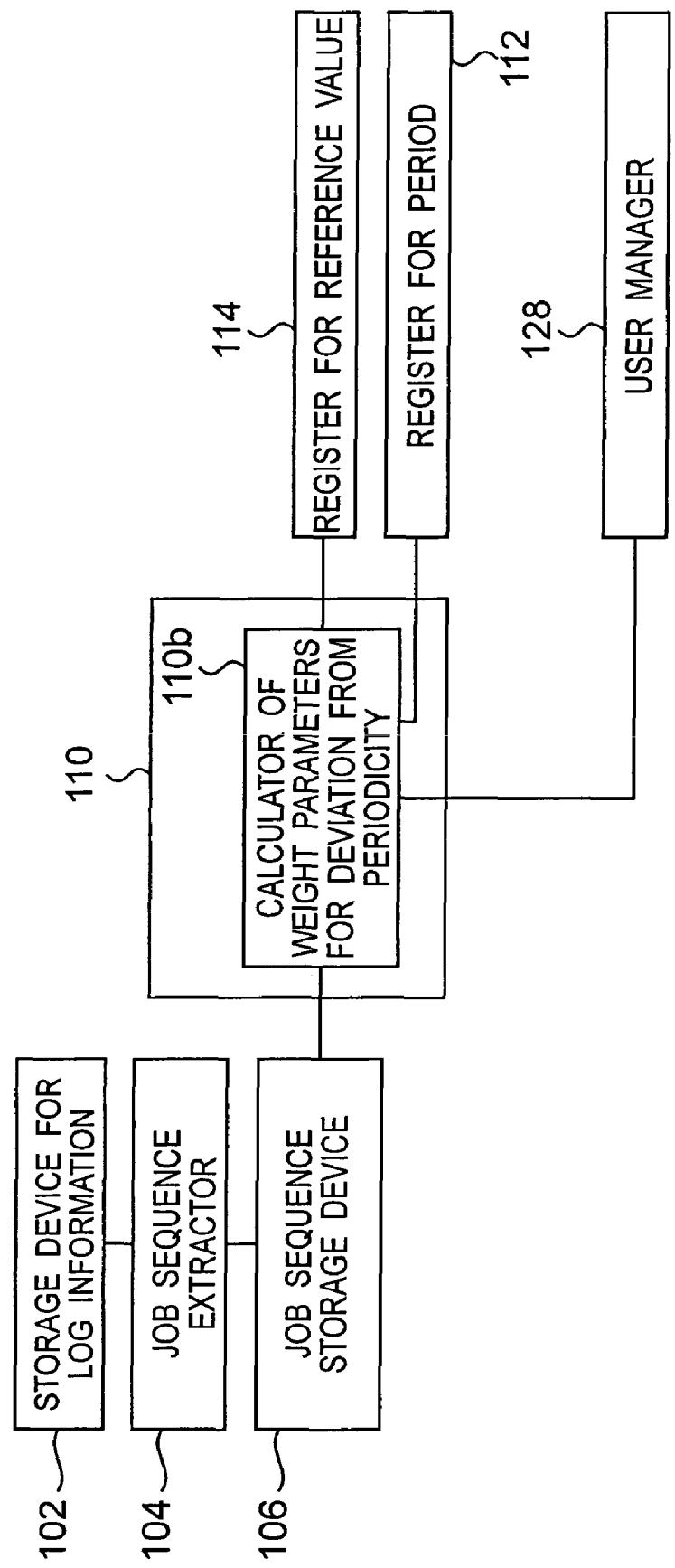
FIG. 11 is a block diagram of calculation of a weight parameter of a job sequence based on periodicity.

FIG. 11 shows another example of the calculator 110 for weight parameter of job sequence. In this example, a particular job sequence is generally executed periodically, and the weight parameter is calculated according to the periodicity of the job sequence. A calculator 110b provided for periodicity in the calculator 110 for the weight parameter of job sequence gives a larger value to the weight parameter as the periodicity of execution period is higher. This is because the reuse value is deemed higher as the periodicity becomes higher.

Figure 12:
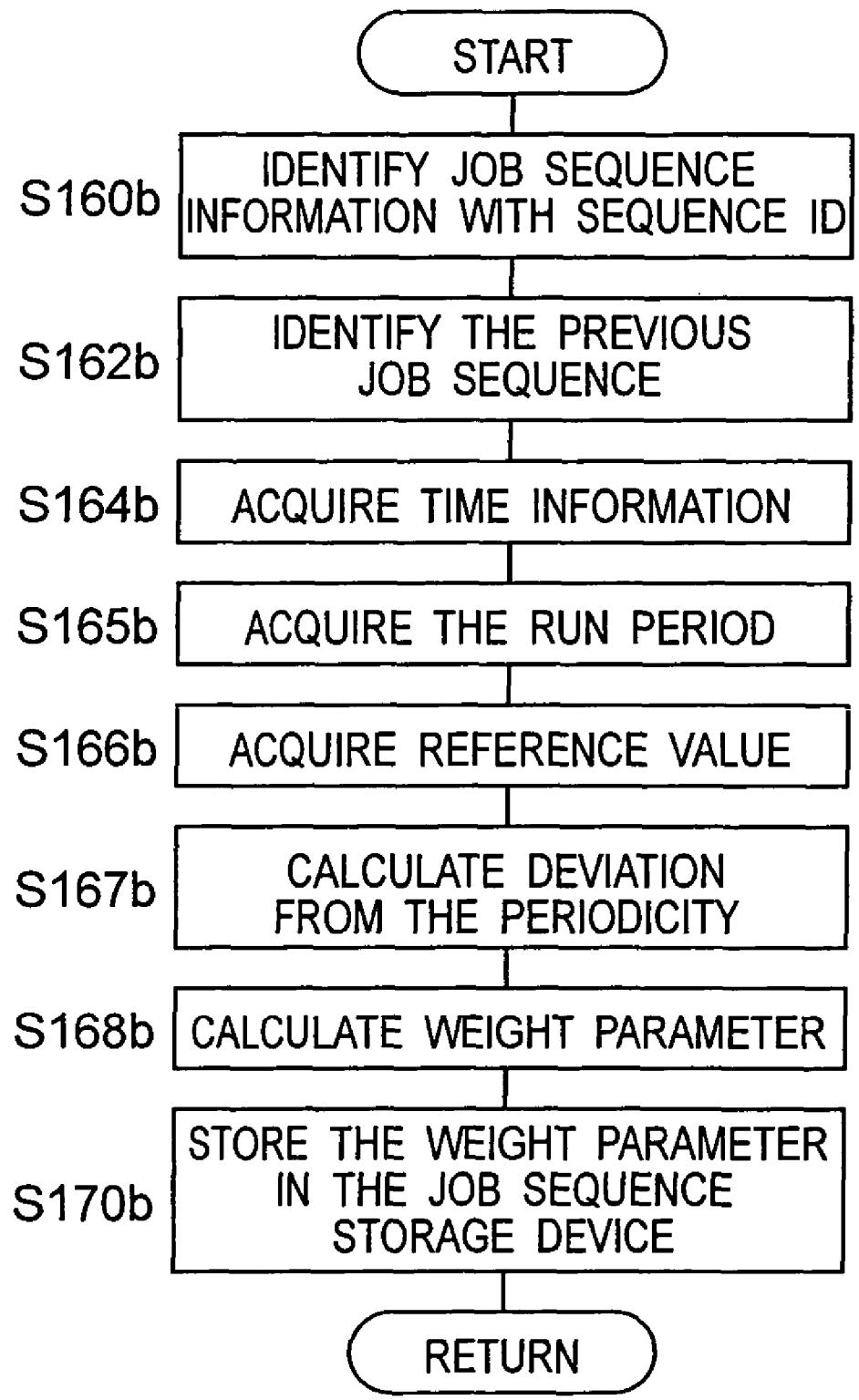
FIG. 12 is a flowchart of the calculation of a weight parameter of a job sequence based on periodicity.

FIG. 12 shows a flowchart for calculating a weight parameter of a job sequence for the periodicity in the calculator 110b. First, as to a job sequence stored in the storage device 106, sequence ID is identified, similarly to the example shown in FIG. 10 (S160b), and a job sequence ID of a previous job sequence having the same settings is determined (S162b). Further, time information when the job sequence was executed is obtained from the setting log information for each job sequence (S164b). Further, the information on the periodicity of the execution of job sequence is obtained from the register 112 shown in FIG. 11 (S165b). Then, the tolerance limit or reference value on the periodicity of the execution time of the job sequence is acquired from the register 114 shown in FIG. 12 (S166b). Discrepancy execution period between the time information of the current execution and that of the previous execution is calculated (S167b), and the weight parameter is calculated according to the discrepancy (S168b). If the same job sequence is executed at a particular date, and the time is within the tolerance limit, a predetermined weight parameter is set as the weight parameter, and it is stored in the column of weight parameter in the table in the storage device 106 (S170b). In this example, the weight parameter has a fixed value. Alternatively, it may be calculated by multiplying a coefficient with a difference from the tolerance limit. The factor may be increased or decreased according to date, time band or a user. Alternatively, the tolerance limit may be set as a date. The user ID and the user name are managed in the user manager 128.

Figure 13:
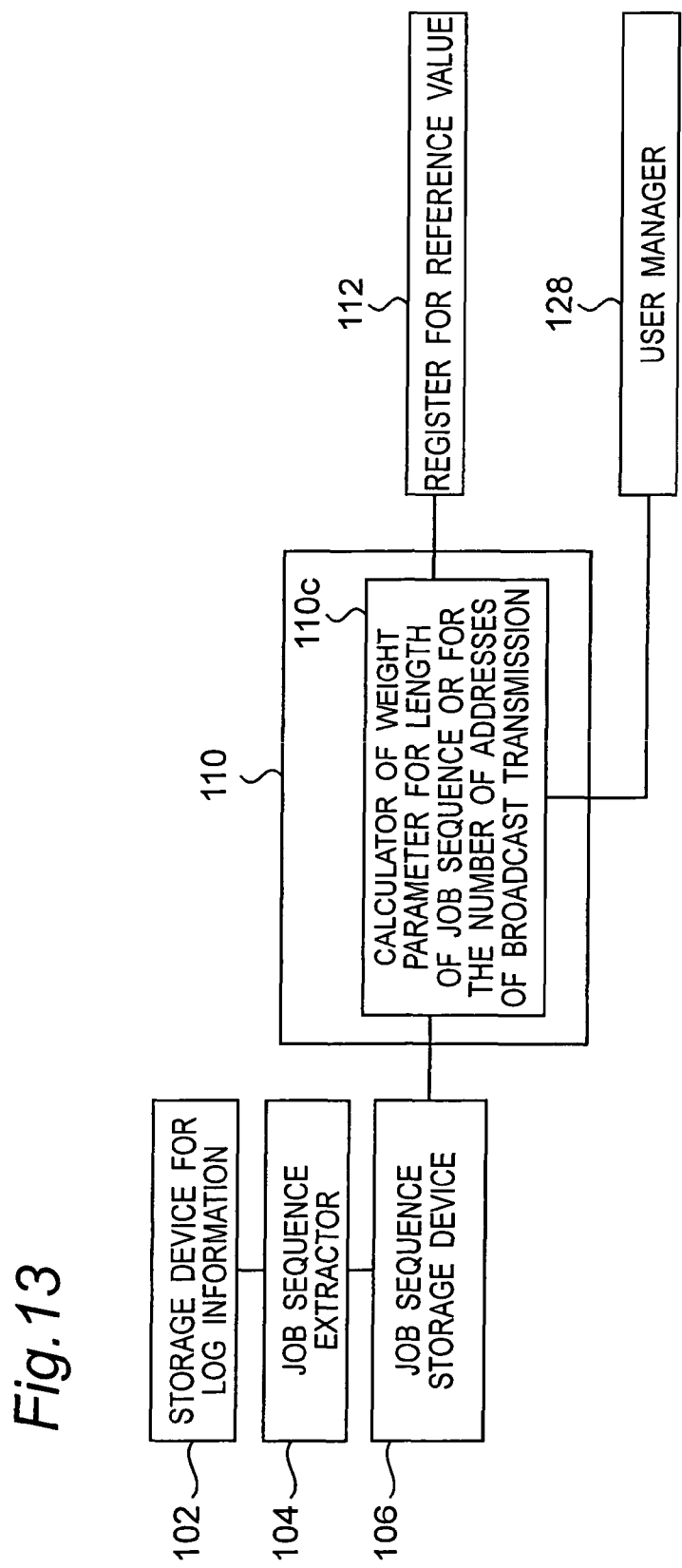
FIG. 13 is a block diagram of calculation of weight parameters of a job sequence based on length of job sequence relative to a reference length and based on the number of addresses for transmission of scan data relative to a reference number.

FIG. 13 shows a different example of the calculator 110 for a weight parameter on job sequence. In this example, a calculator 110c in the calculator 110 calculates a weight parameter related to the reference length of job sequence and another weight parameter related to the reference number of addresses in the broadcast transmission for scan-and-transmit operation. As to the length of job sequence, when a job sequence has a length longer than the reference length, the weight parameter is set to have a larger value according to a difference of the length relative to the reference length. When the length of job sequence is longer, the number of setting items is larger, so that the burden for se-setting of job sequence becomes larger. Then, it is thought that such a long job sequence is evaluated to have a high reuse value in this example. On the other hand, as to a job sequence having the number of addresses larger than a reference value, the weight parameter is set to have a larger value in correspondence to the number of addresses exceeding the reference value. When the job sequence is used again, it is more likely that the same addresses are used if the number of addresses in broadcast transmission is larger.

Figure 14:
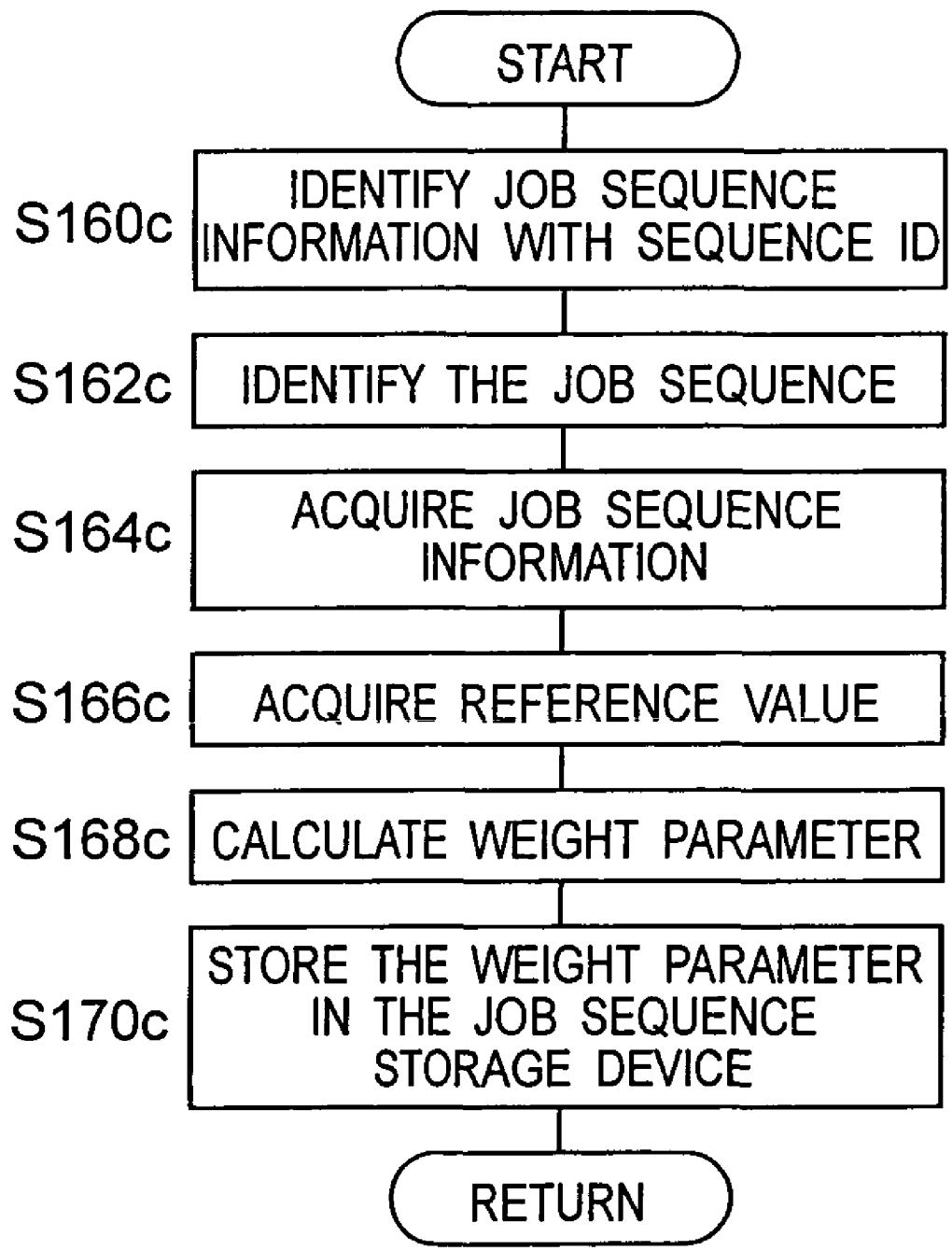
FIG. 14 is a flowchart of the calculation of a weight parameters of a job sequence.

FIG. 14 shows a flowchart of calculation of the weight parameters of job sequence in the calculator 110c. Similarly to the example shown in FIG. 10, the sequence ID is identified on a job sequence stored in the storage device 106, (S160c), and a job sequence having the same settings is identified (S162c). Further, similarly to the example shown in FIG. 10, the length of the job sequence and the number of addresses for scan-and-transmit are acquired through the job sequence storage device 106 from the job sequence extractor 104 and the setting log information storage device 102 (164c). Then, the setting values and reference values in the register 114 are acquired (S166c), and the setting values are compared with the reference values, and weight parameters are calculated according to predetermined calculation methods or formulae (S168c). Then, the weight parameters are stored in the table for the job sequence in the storage device 106 (S170c). The weight parameter on the length of a job sequence is calculated, for example, by multiplying a coefficient to a length exceeding the reference value. The weight parameter on the number of broadcast addresses is calculated, for example, by multiplying a coefficient to a number exceeding the reference value of addresses. In each case, the weight parameter may be a fixed value. Further, the reference value and/or the calculation method may be changed according to the contents of operations in the job sequence. Alternatively, the user can change them. The user is identified by the user manager 128 based on the user identification information.

Figure 15:
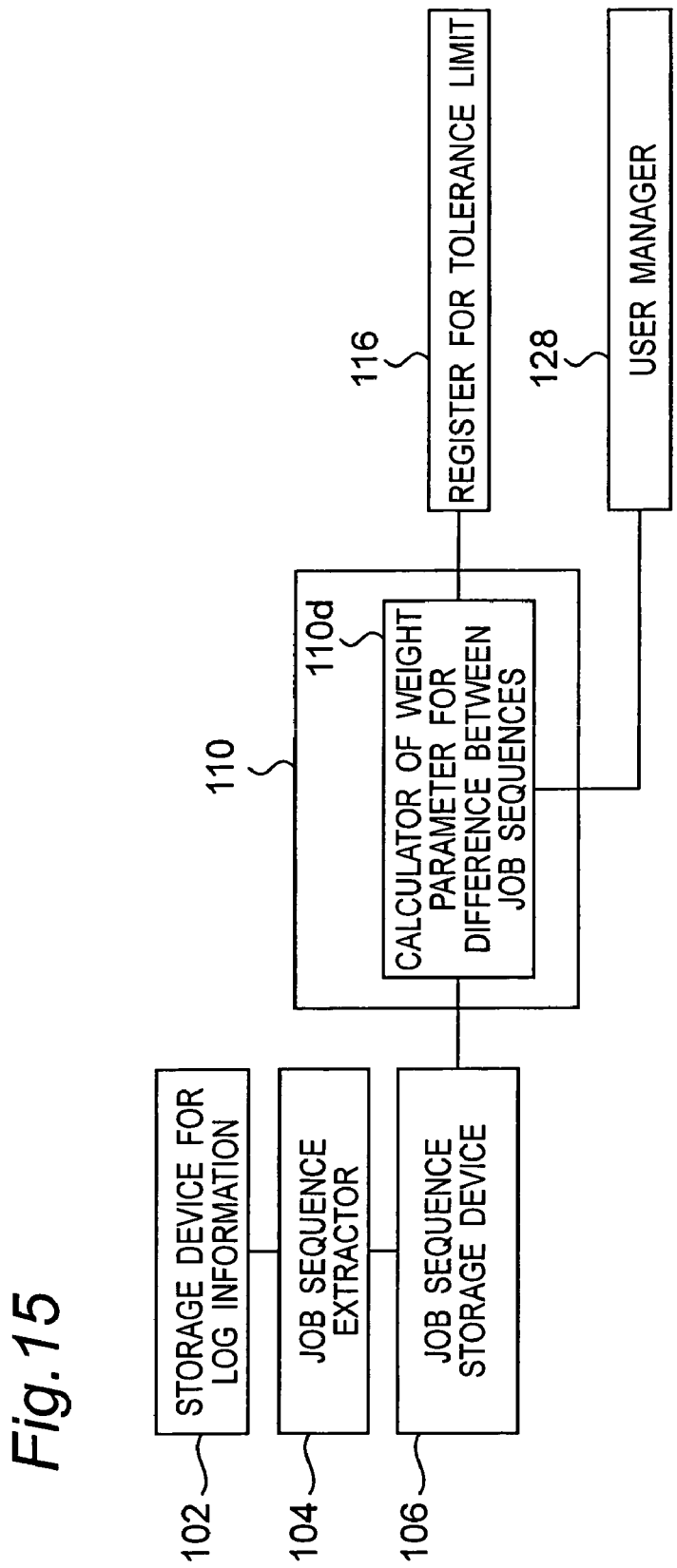
FIG. 15 is a block diagram of calculation of a weight parameter of a job sequence based on a tolerance of a difference between two job sequences.

FIG. 15 shows a further example of the calculator 110 for a weight parameter on job sequence. In this example, a calculator 110d for difference between job sequences in the calculator 110 calculates a weight parameter for a job sequence according to a tolerance value on the number of differences between two job sequences. The difference denotes a sum of the number of log IDs of different setting items between the two job sequences and log IDs having the same setting item, but having different contents among the log IDs included in the two log sequences. As to a job sequence having use frequency larger than a reference value, but having the number of differences smaller than the tolerance value, the weight parameter is set to have a smaller value according as the number of differences is larger. For example, if the number of differences is one, the weight parameter is set to 100, while if the number of differences is ten, the weight parameter is set to 10. This enhances user's convenience to decrease the burden for resetting on the job sequence having a low use frequency, but having a small number of differences.

Figure 16:
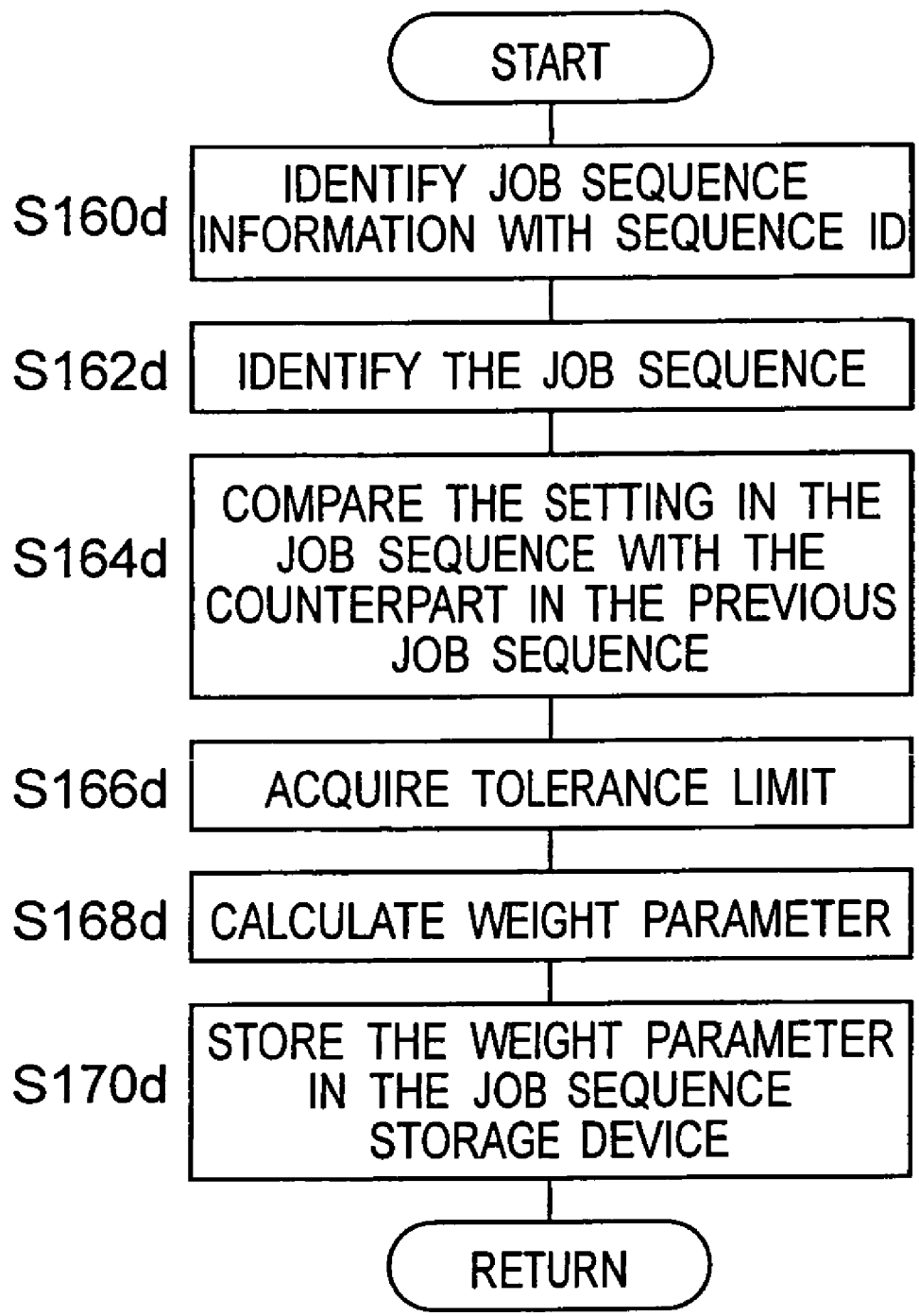
FIG. 16 is a flowchart of the calculation of a weight parameter of a job sequence based on a difference between two job sequences.

FIG. 16 shows a flowchart of the calculation of a weight parameter of job sequence in the calculator 110d. Similarly to the example shown in FIG. 10, the sequence ID is identified for a job sequence stored in the storage device 106, (S160d), and a job sequence having the same settings is identified with the sequence ID (S162d). Further, setting log data is acquired for each job sequence stored in the storage device 106, and each setting in a series of settings in the job sequence is compared with the former job sequence (164d). Then, the tolerance limit in the register 116 is acquired (S166d). As to the job sequence identified at step S162d, if it has use frequency obtained at step S14 in FIG. 7 higher than a reference value and having the number of different settings within the tolerance limit in the register 116, the weight parameter is calculated and is stored in the table for the job sequence in the storage device 106 (S168d). The weight parameter may be calculated by multiplying a coefficient with the number of differences, or it may be a fixed value. Further, the calculation method or formula may be changed according to the contents of operations in the job sequence or according to a user.

Some examples are explained above on the calculation of weight parameter. If a weight parameter is calculated on each of a plurality of setting items, an overall weight parameter is calculated finally. The weight parameter values obtained above are added with predetermined coefficients. The coefficients may be changed by a user. For example, the coefficients may be changed for each user, or they may be changed according to the contents of a job sequence. These changes may be performed by a user. The weight parameters may be determined by using subtraction, if necessary. Thus, the weight parameter can be determined more appropriately according to the use situation of a user. For example, in the calculator 110c shown in FIG. 13, if the length of a job sequence is shorter than a reference value in the register 114, a negative value in correspondence to the different of the length is determined, and it is stored in the table in the storage device 106. Thus, the weight parameter can be decreased.

In the job sequence evaluator 118, use frequencies and weight parameters of the job sequences stored in the storage device 106 are acquired, and it is decided according to the evaluation criterion value stored in the register 120 whether to present them to the user or not, or it stores the priority of presentation as a result of evaluation in a column in the job sequence presenter 126. The evaluation method may be changed according to the contents of job sequence or the user. The job sequence presenter 126 displays the setting sequence of the job sequence in the display device 122 according to the evaluation result, or it registers the job sequence to a one-touch key according to user's operation with the operation device 124 in the operation panel 34. Further, it transmits the information through the communication device 20 to the computer 42 or the image processing apparatus connected to the network 40, or it receives an instruction of registration therefrom.

Figure 17A:
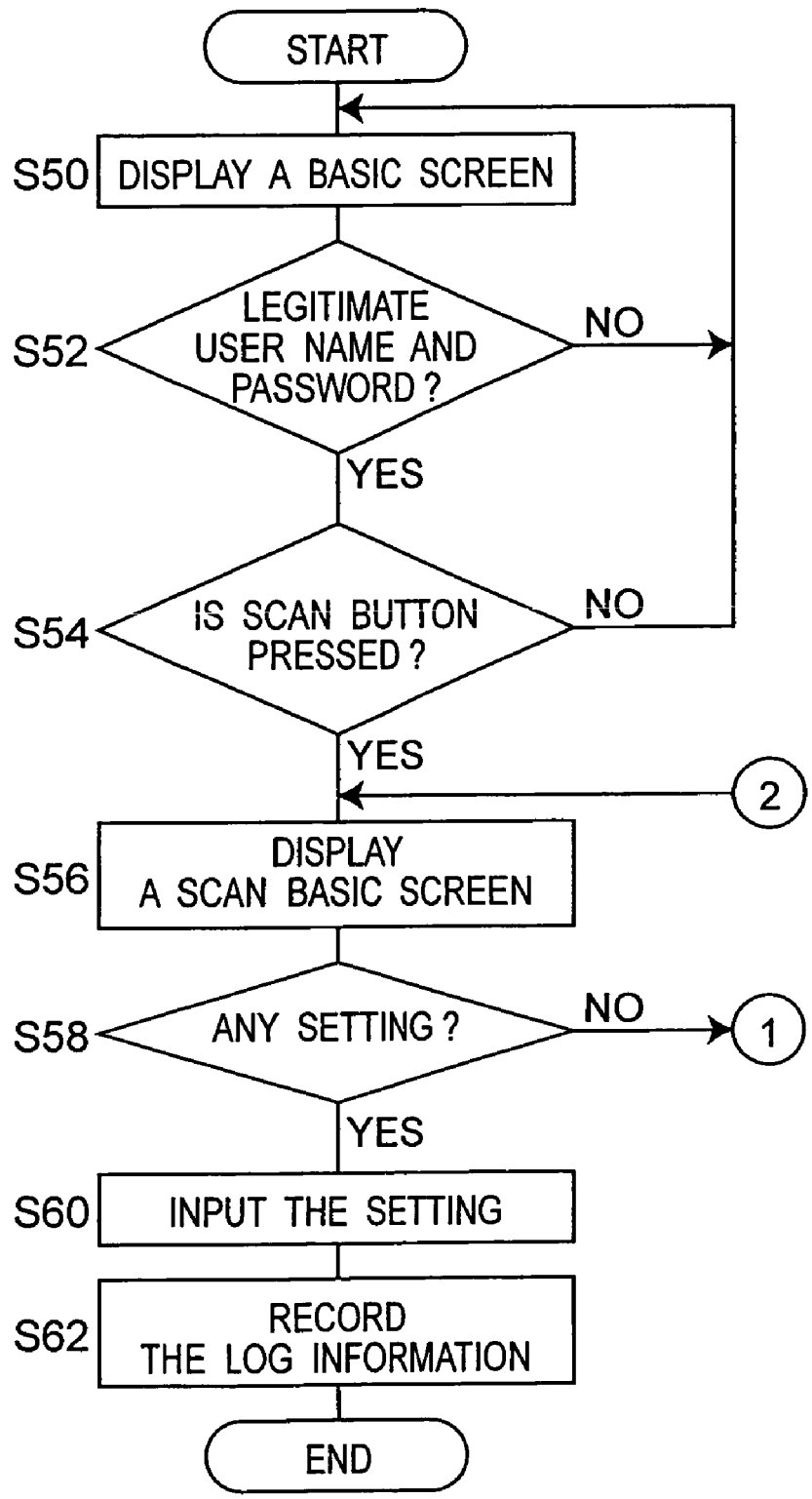
FIGS. 17A and 17B are a part and the remainder of a flowchart for presenting and registering a job sequence.
Figure 17B:
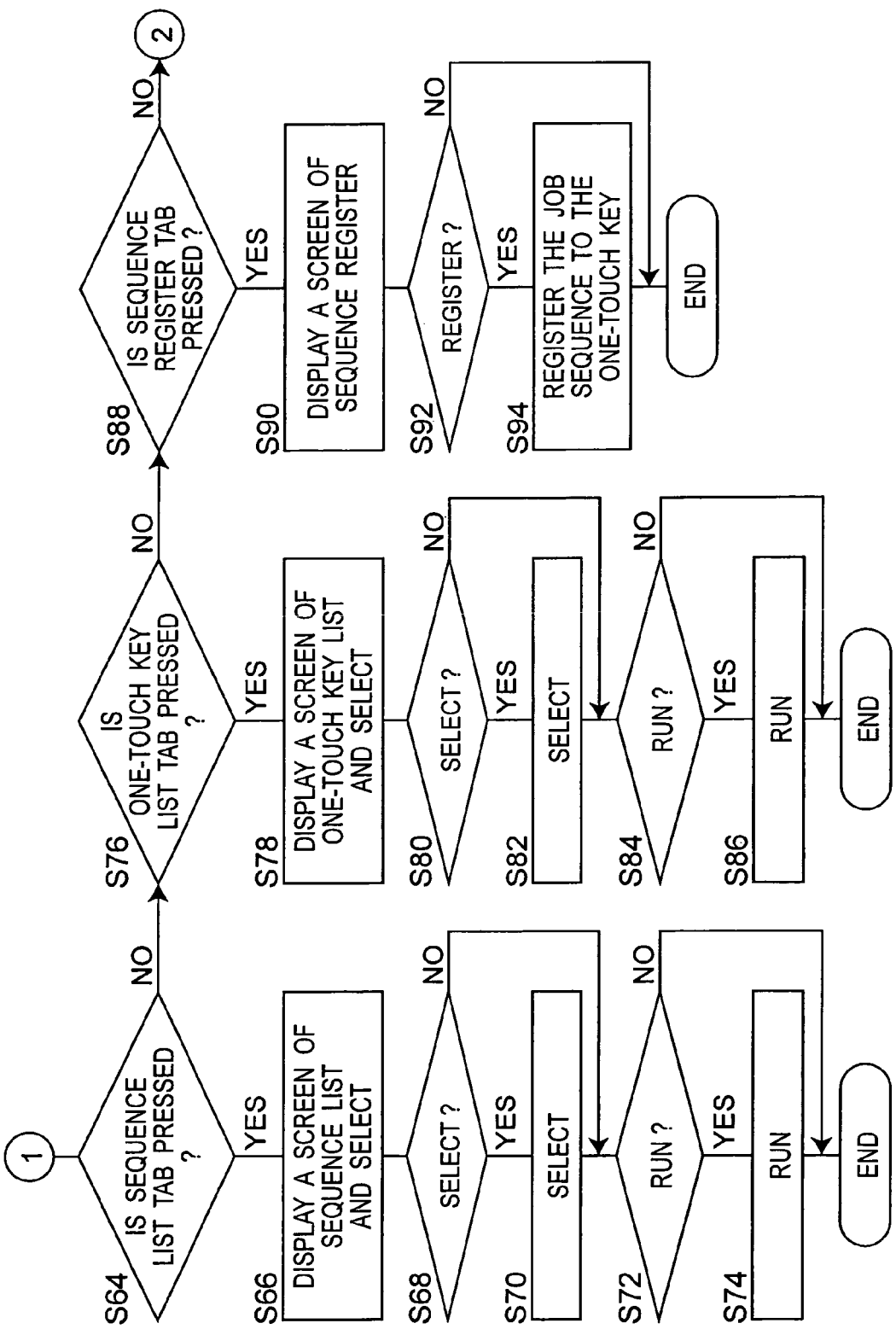

The presentation and registration of job sequence are performed according to the above-mentioned evaluation of job sequences. FIGS. 17A and 17B show a transition flow from a basic screen on job sequence to various screens when the MFP is used. Here, a sequence starting from scan is explained, but a different function from scan may be processed similarly. When a user logs in, the basic screen (refer to FIG. 18) is displayed in the operation panel 34 (S50). When a true user name and a true password are accepted (YES at S52), and when the scan button is detected to be pressed (YES at S54), the user can set any one of functions. When the user selects scan in the basic screen, the scan basic screen (refer to FIG. 19) is displayed (S56).

Next, a processing is started according to an operation in the scan basic screen. When various operations for scan are inputted (YES at S58), the setting is inputted (S60), and the setting log is stored in the storage device 102 for setting log information (S62). The setting log is recorded for each setting input.

The processing following step S64 corresponds to the job sequence presenter 126 shown in FIG. 2. When sequence list tab is detected to be pressed in the scan basic screen (YES at S64), a screen for sequence list and select is displayed (S66). Next, when a user selects one of the job sequences in the sequence list in the screen (YES at S68), the selected job sequence is selected (d70). When run button is pressed (YES at S72), the job sequence is executed (S74).

When one-touch key list tab is detected to be pressed (YES at S76), a screen for one-touch key list and select (refer to FIG. 21) is displayed (S78). When a user selects one of the one-touch keys in the list in the screen (YES at S80), the selected one-touch key is selected (S82). When run button is pressed (YES at S84), the job sequence registered to the one-touch key is executed (S86).

When sequence register tab is detected to be pressed (YES at S88), a screen for sequence registration (refer to FIG. 22) is displayed (S90). When a user instructs to register it to a one-touch key (by selecting a job sequence, selecting a one-touch key and inputting a name of the job sequence) (YES at S92), the job sequence is registered to the one-touch key (S94).

Figure 18:
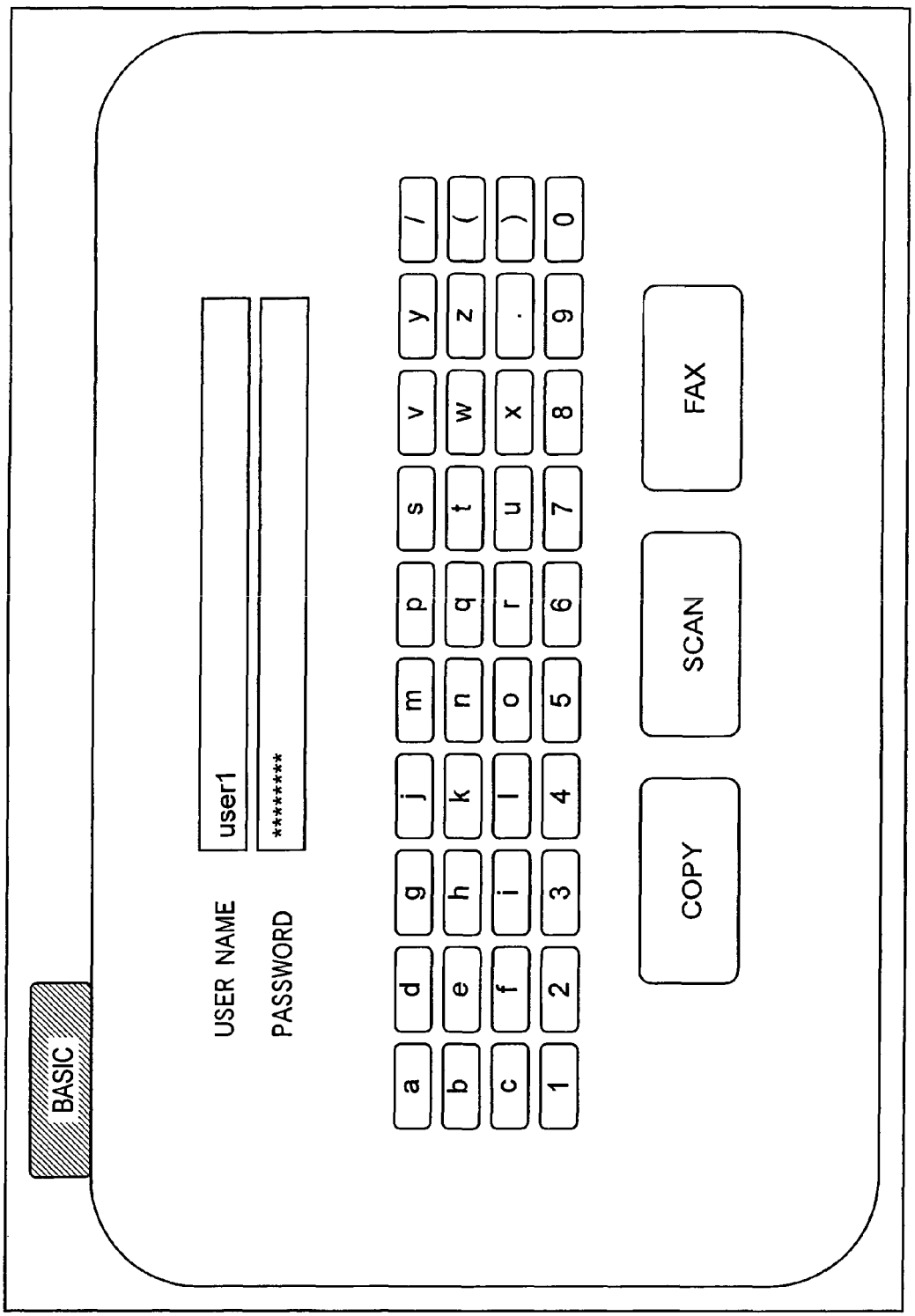
FIG. 18 is a diagram of a basic screen.
Figure 19:
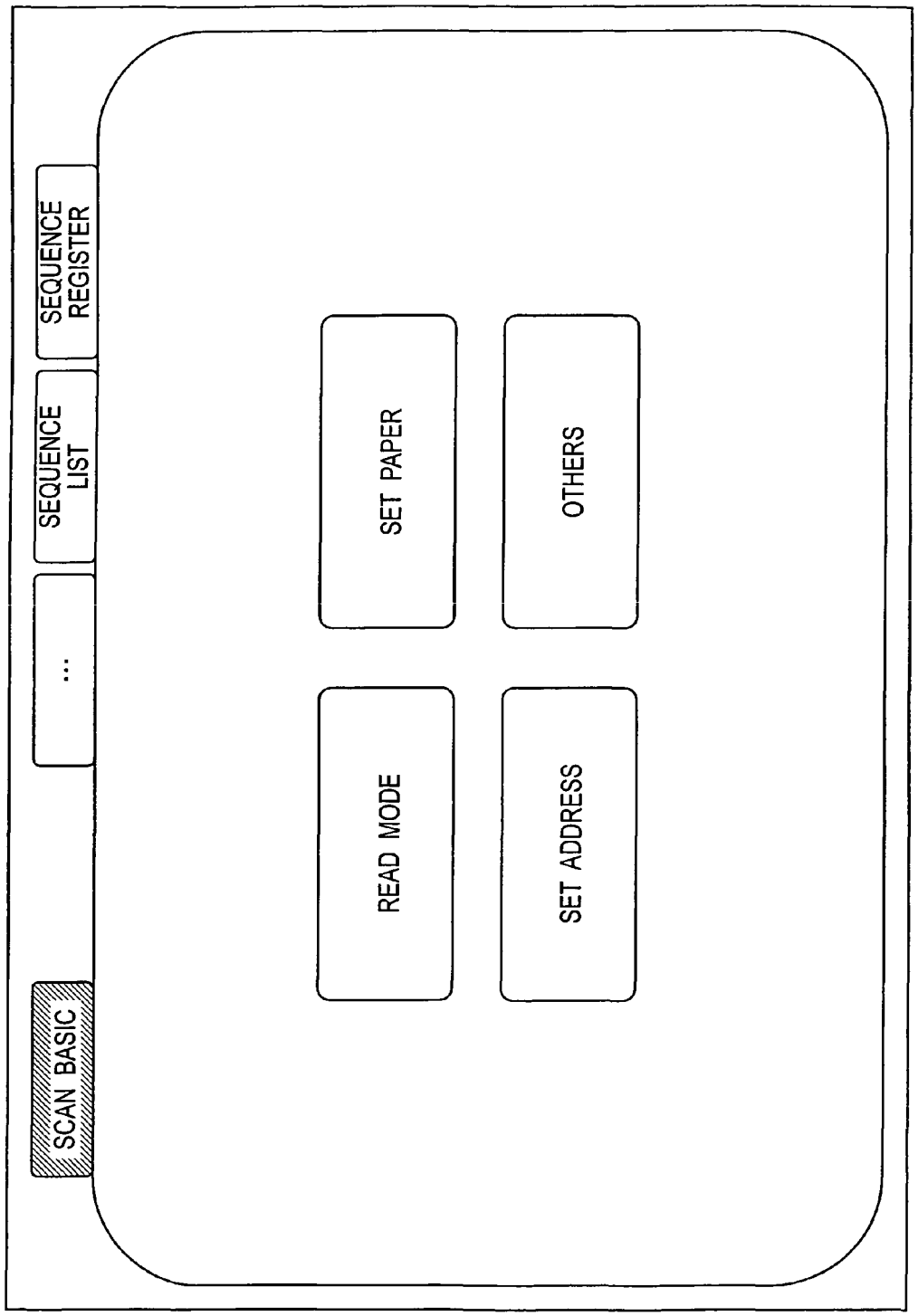
FIG. 19 is a diagram of a scan basic screen.

FIG. 18 shows an example of a basic screen shown in the display device 122 in the operation panel 34. In the basic screen, text boxes for inputting user name and password are provided for log-in authentication. Alternatively, information from an external portable storage medium such as a USB memory or an IC card is received for the log-in authentication. When it is confirmed based on the data in the user manager 128 that user information of a legitimate user is inputted, the log-in is completed. Next, a button of copy, scan or FAX is pressed, the basic screen is transmitted to a screen for the selected function. When scan function is selected, scan basic screen as shown in FIG. 19 is displayed. In the screen, main setting items such as read mode, paper setting, address setting and others necessary for executing the scan are displayed, and various tabs are displayed at the top in the screen. The tabs include tabs for transition to screens for the above-mentioned setting sequences.

Figure 20:
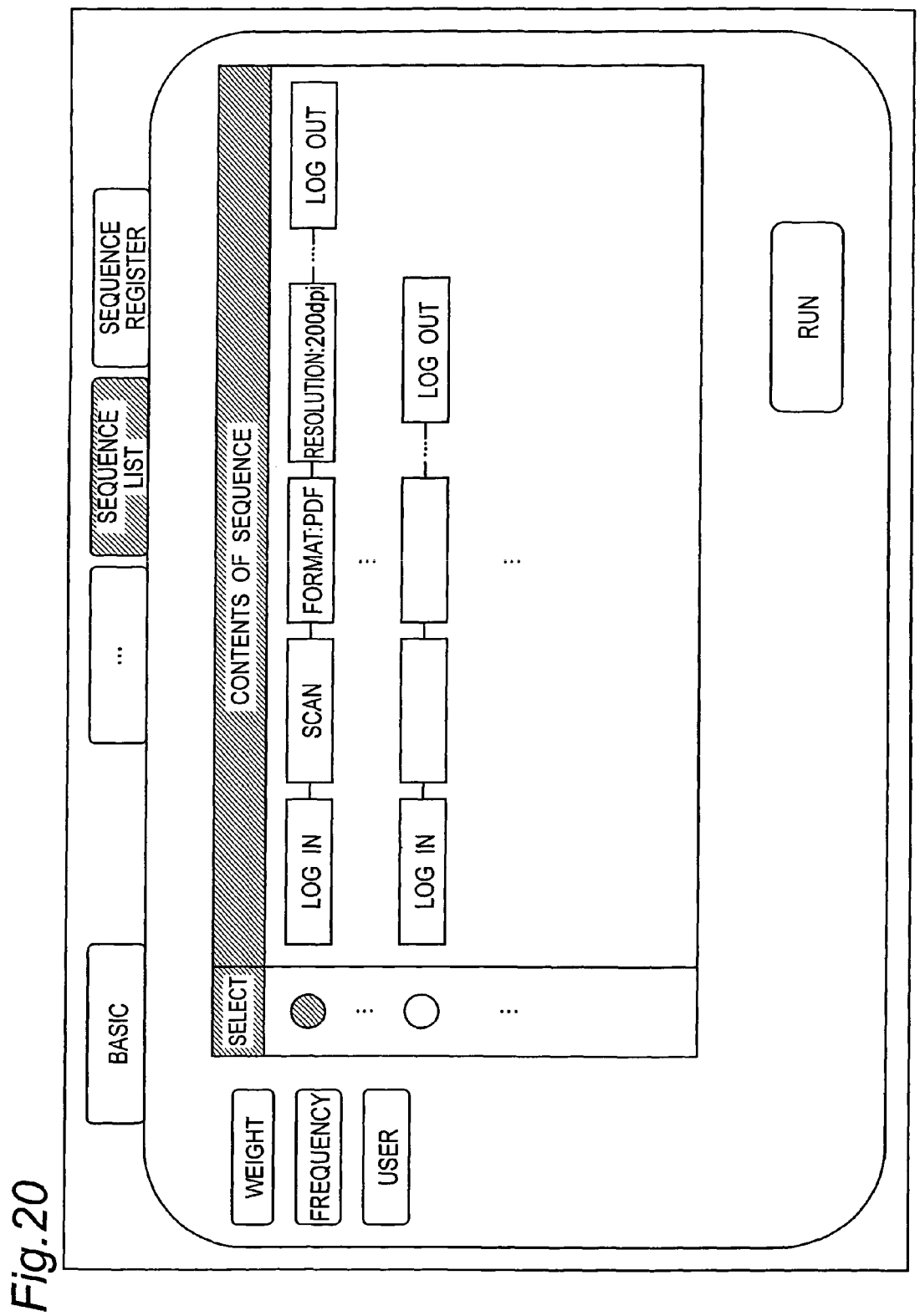
FIG. 20 is a diagram of a job sequence list screen.

FIG. 20 shows an example of a sequence list screen displayed when sequence list tab is selected, wherein job sequences (or sequences of setting) are displayed in a box of contents of sequence. In the presentation of job sequence list, when one of the buttons of weight, use frequency or user is pressed at the left side in the screen, a list of the corresponding job sequences is displayed according to the selection on the order of weight, user frequency or user setting (a rule for the ordering set by the user). When the button for weight is pressed, the job sequences are displayed in the ascending order or in the descending order of weight parameter. When the button for frequency is pressed, they are displayed in the ascending order or in the descending order of use frequency. When the button of user is pressed, they are displayed according to the user setting. When the user selects one of the job sequences and pressed the run button in the operation device 124, the selected job sequence is executed. In the default setting, for example, the job sequences are displayed in the order of weight parameter. In the display in the order of weight parameter, a job sequence having a low use frequency but having a high reuse value can be selected and executed easily. The contents of a selected job sequence is displayed so that the user can understand it easily. In concrete, a series of setting items in the job sequences are displayed as a series of rectangles, and the contents of setting are shown in the rectangles such as "scan", "format:PDF" and "resolution:200 dpi".

Figure 21:
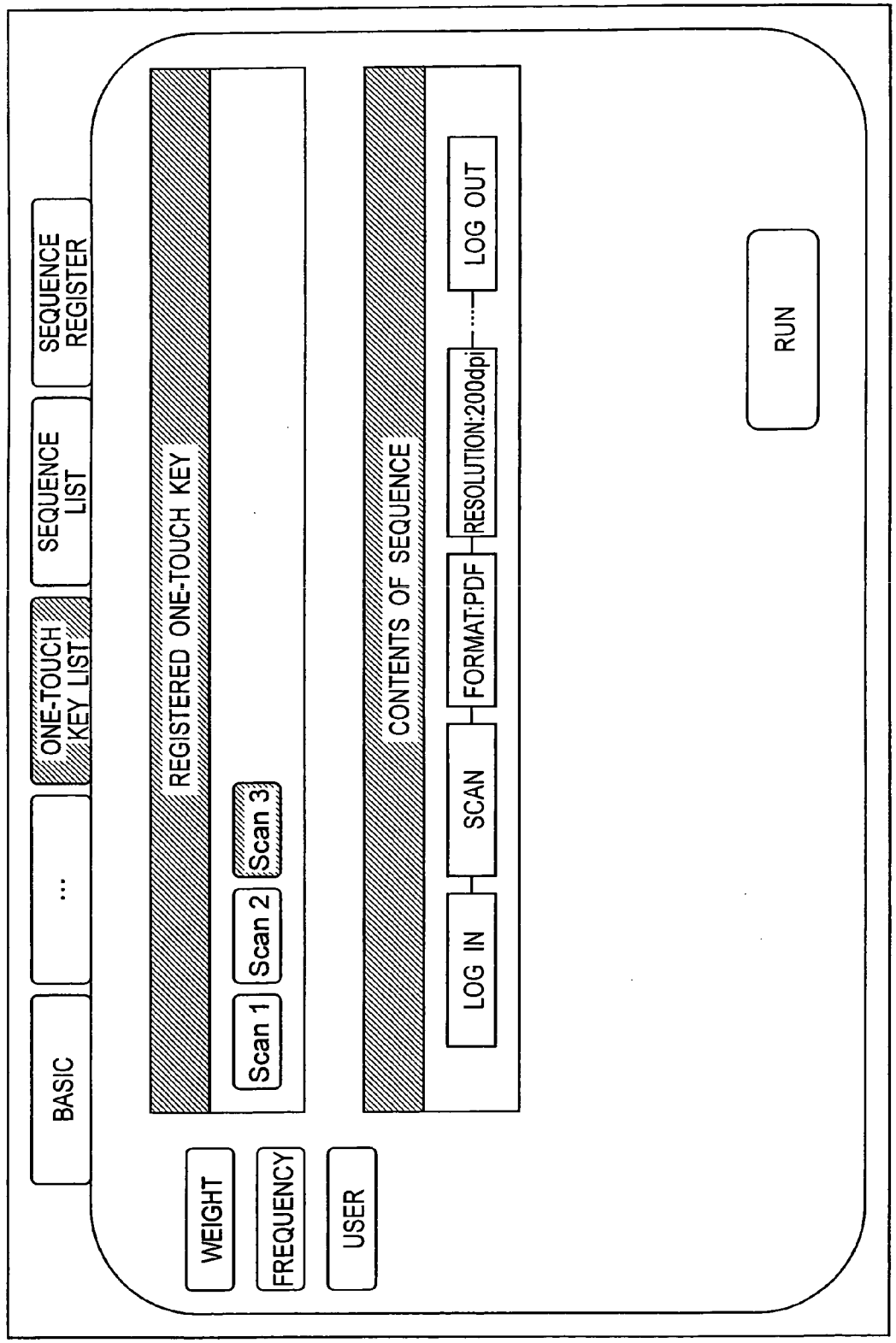
FIG. 21 is a diagram of a one-touch key list screen.

FIG. 21 shows an example of one-touch key list screen when the one-touch key list tab is selected. Registered one-touch keys are displayed in the box of registered one-touch keys. In this example, three one-touch keys of Scan_1, Scan_2 and Scan_3 are registered. When Scan_3 is selected, the contents of the registered job sequence of Scan_3 are displayed in the box of contents of sequence according to the selection. Thus, the operator can confirm the contents of the registered job sequence in the screen. When the run button is pressed after a one-touch key is selected, the job sequence registered at the one-touch key is executed. It is possible to change a part of the job sequence such as "address" (an address of an electronic mail) manually at the operation device 124 and to run the changed job sequence. Thus, transmission to different addresses becomes possible for the same settings of scan. Similarly to the screen shown in FIG. 20, in the presentation of registered one-touch keys, when one of the buttons of weight, user frequency or user is pressed at the left side in the screen, a list of the corresponding job sequences is displayed according to the selection on the ascending or descending order of weight, the ascending or descending order of user frequency or according to the user setting. By displaying the one-touch keys in the order of weight parameter, a one-touch key having a high reuse value can be selected easily.

Figure 22:
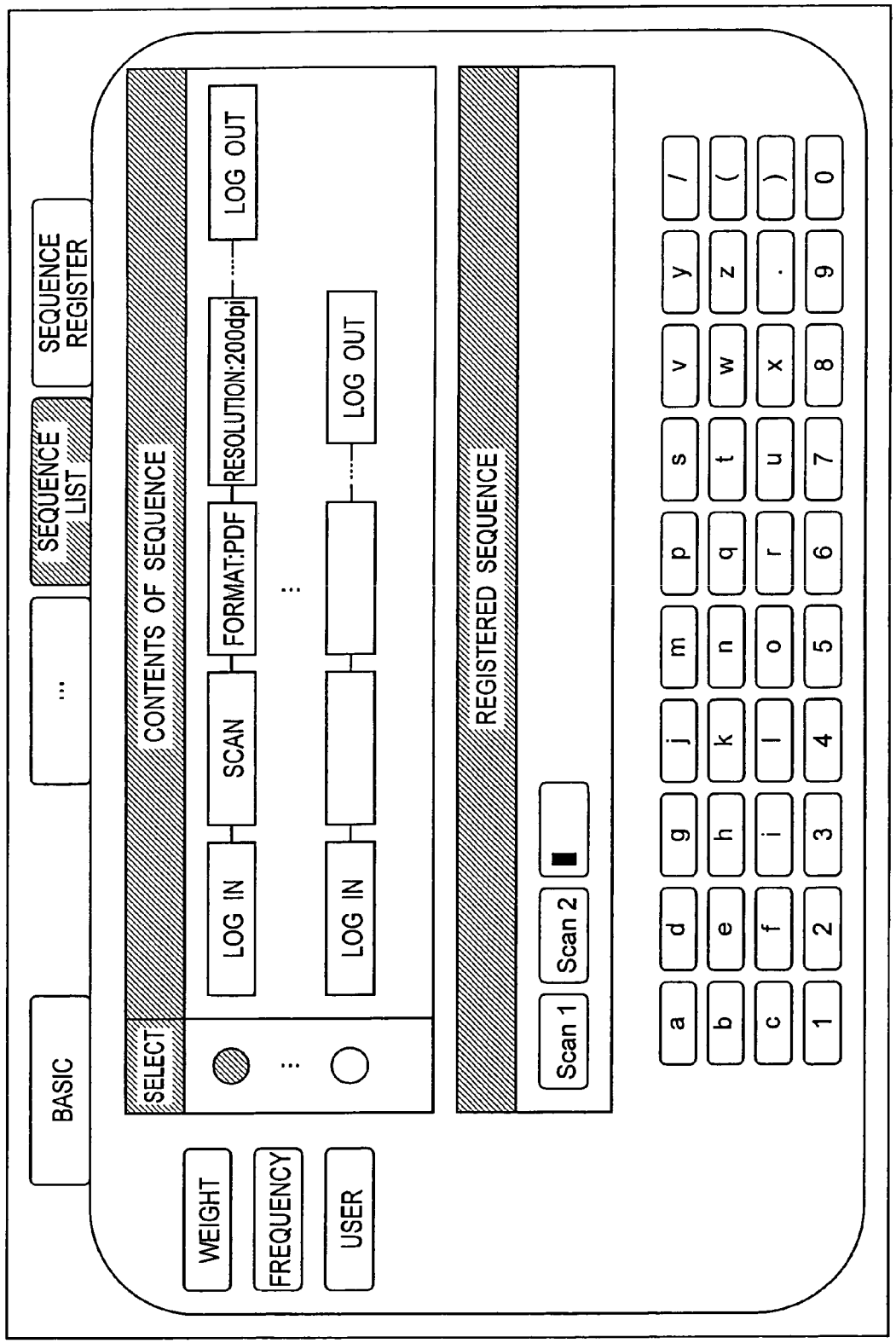
FIG. 22 is a diagram of a screen for registering a job sequence.

FIG. 22 shows an example of job sequence registration screen when sequence registration tab is pressed. In the screen a job sequence can be registered to a one-touch key. In the box of setting sequence, a series of settings in correspondence to the selected job sequence is displayed. When the user selects a one-touch key and inputs its name, the selected series of settings is registered to the one-touch key. In an example shown in FIG. 22, the job sequence at the top in the box is selected (as shown with a solid circle), and its name is started to be inputted to a third one-touch key wherein a cursor is displayed for inputting its name. The name to be registered in the third one-touch key is inputted with the alpha-numeric keys shown at the bottom side. Alternatively, only the number of a one-touch key is specified and registered. By showing the registered one-touch keys in the screen, the user can run the registered job sequence easily. Similarly to the screen shown in FIG. 20, in the box of setting sequence, when one of the buttons of weight, user frequency or user is pressed at the left side in the screen, a list of the corresponding job sequences is displayed according to the selection on the ascending or descending order of weight, the ascending or descending order of user frequency or according to the user setting. By displaying the one-touch keys in the order of weight parameter, a one-touch key having a high reuse value can be registered to one-touch keys easily.

In the above-mentioned embodiments, the calculation of weight parameter is explained on a job sequence. However, needless to say, it can be calculated similarly on an operation with only one log ID.

Figure 23:
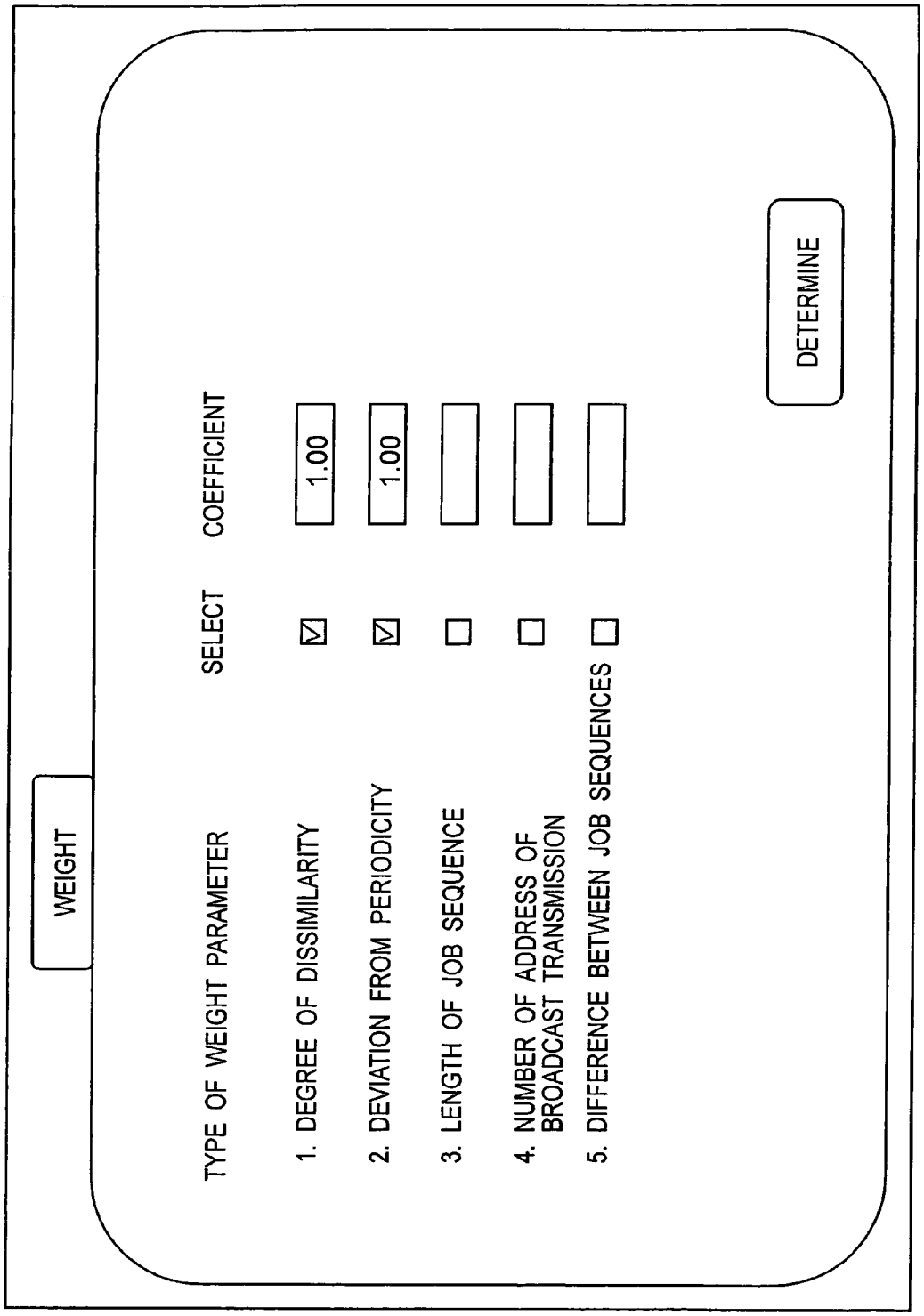
FIG. 23 is a diagram of a screen for setting weight parameters.

Further, in the above-mentioned embodiments, the weight parameter is calculated on various items such as degree of dissimilarity, deviation from periodicity, length of job sequence, number of addresses of broadcast transmission and difference between job sequences, and it is set beforehand which of the items is used. Alternatively, a screen for setting weight parameters is displayed when weight tab is pressed, and the user sets how to calculate an overall weight parameter based on the weight parameters on various items. In a screen for weight setting shown in FIG. 23, the user can set a coefficient or coefficients to select an item or items. In the example shown in FIG. 23, the weight parameters on two items are added simply. However, it is also possible to set different coefficients. Though not shown, various modifications are possible on the calculation of weight parameters. For example, the coefficients can be changed according to the contents of job sequence. Alternatively, a reference value used for the selected item can be set by a user. It is also possible that a user sets a formula for calculating a weight.

In the above-mentioned embodiments, the reuse value is evaluated on the settings by all the users of the image forming apparatus. However, it is also possible to evaluate reusability for users in a particular range or for each user.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An image processing apparatus comprising:
   an input device for a user to set a sequence of instructions for a function to be carried out by the image processing apparatus;
   a recorder which records the sequence of instructions set by said input device with information relating to the sequence of instructions as setting log data;
   a calculator which calculates a weight parameter on reuse value of the sequence of instructions based on the recorded sequence of instructions, wherein the weight parameter on reuse value relates to the likelihood of using the sequence of instructions in the future;
   a storage device for storing operation information including the setting log data and the calculated parameter;
   a decider which decides based on the setting log data stored in said storage device whether the weight parameter satisfies a reference value; and
   a presenter which presents the setting log data having the weight parameter satisfying the reference value.

2. The image processing apparatus according to claim 1, further comprising:
   an extractor which extracts setting log data related to each other from the setting log data recorded; and
   a second storage device which stores the extracted setting log data and the order thereof as the operation information.

3. The image processing apparatus according to claim 1, further comprising:
   an operation device including a one-touch key; and
   a register which registers the operation information having the weight parameter satisfying the reference value to the one-touch key.

4. The image processing apparatus according to claim 1, wherein said input device comprising:
   a display device for presenting the operation information; and
   an operation device with which a user change the operation information presented by said display device;
   whereby the image processing apparatus performs the functional operation based on the changed operation information.

5. The image processing apparatus according to claim 1, wherein said input device comprises:
   a display device which displays the reference value; and
   an operation device with which a user changes the reference value displayed by said display device.

6. The image processing apparatus according to claim 1, wherein said calculator calculates the weight parameter based on a difference between a setting value of an item in the one or more setting items and a default value.

7. The image processing apparatus according to claim 1, wherein said calculator calculates the weight parameter based on discrepancy from periodicity determined by a period data of execution of the one or more setting items and a time elapsed after a previous execution thereof.

8. The image processing apparatus according to claim 1, wherein said calculator calculates the weight parameter based on a difference of a number of setting items included in the one or more setting items information from a reference value for the difference.

9. The image processing apparatus according to claim 1, wherein the one or more setting items are relevant to broadcast transmission, and said calculator calculates the weight parameter based on a difference of a number of addresses of broadcast transmission from a reference value for the difference.

10. The image processing apparatus according to claim 1, wherein said calculator calculates the weight parameter based on a difference between the one or more setting items and another one or more setting log data in the recorded setting log data and a tolerance limit for the difference.

11. A method for image processing comprising:
   receiving user's setting of a sequence of instructions for a function to be carried out by an image processing apparatus;
   recording the sequence of instructions for a function set by the user with information relating to the sequence of instructions for a function as setting log data;
   calculating a weight parameter on reuse value of the sequence of instructions based on the recorded sequence of instructions, wherein the weight parameter on reuse value relates to the likelihood of using the sequence of instructions in the future;
   storing operation information including the setting log information and the calculated parameter;
   deciding based on the setting log data whether the weight parameter satisfies a reference value; and
   presenting the setting log data having the weight parameter satisfying the reference value.

12. The method according to claim 11, further comprising:
   extracting the setting log data related to each other in the setting log data recorded; and
   storing the extracted setting log data and the order thereof as the operation information.

13. The method according to claim 11, where the operation information having the weight parameter satisfying the reference value is registered to a one-touch key included in an operation panel.

14. The method according to claim 11, wherein when the user's setting of an item is received, the operation information is displayed, and a change of the presented operation information is received, whereby the image processing is performed based on the changed operation information.

15. The method according to claim 11, further comprising:
   displaying the reference value; and
   receiving user's change on the reference value displayed.

16. The method according to claim 11, wherein the weight parameter is calculated based on a difference between a setting value of an item in the one or more setting items and a default value for the difference.

17. The method according to claim 11, wherein the weight parameter is calculated based on discrepancy from periodicity by acquiring a period data of execution of the one or more setting items and a time elapsed after a previous execution thereof.

18. The method according to claim 11, wherein the weight parameter is calculated based on a difference of the number of setting items included in the one or more setting items from a reference value for the difference.

19. A non-transitory computer-readable storage medium which stores a program comprising the steps of:
   receiving user's setting of a sequence of instructions for a function to be carried out by an image processing apparatus;
   recording the sequence of instructions for a function set by the user with information relating to the sequence of instructions for a function as setting log data;

calculating a weight parameter on reuse value of the sequence of instructions based on the recorded sequence of instructions, wherein the weight parameter on reuse value relates to the likelihood of using the sequence of instructions in the future;
storing operation information including the setting log information and the calculated parameter;
deciding based on the setting log data whether the weight parameter satisfies a reference value; and
presenting the setting log data having the weight parameter satisfying the reference value.

20. The non-transitory computer-readable storage medium according to claim 19, wherein the program further comprising the steps of:
extracting the setting log data related to each other in the setting log data recorded; and
storing the extracted setting log data and the order thereof as the operation information.

* * * * *